(12) United States Patent
Kijima et al.

(10) Patent No.: US 10,787,103 B2
(45) Date of Patent: Sep. 29, 2020

(54) SEAT FRAME

(71) Applicant: TS TECH CO., LTD., Asaka-shi, Saitama (JP)

(72) Inventors: Yuta Kijima, Tochigi (JP); Takanori Yamaguchi, Tochigi (JP); Wataru Nishii, Tochigi (JP); Satoshi Fujita, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/765,013

(22) PCT Filed: Oct. 30, 2015

(86) PCT No.: PCT/JP2015/080829
§ 371 (c)(1),
(2) Date: Mar. 30, 2018

(87) PCT Pub. No.: WO2017/056337
PCT Pub. Date: Apr. 6, 2017

(65) Prior Publication Data
US 2018/0290568 A1    Oct. 11, 2018

(30) Foreign Application Priority Data
Oct. 2, 2015  (JP) ................................ 2015-197156

(51) Int. Cl.
*B60N 2/427* (2006.01)
*B60N 2/42* (2006.01)
(Continued)

(52) U.S. Cl.
CPC ........... *B60N 2/4228* (2013.01); *B60N 2/427* (2013.01); *B60N 2/4235* (2013.01); *B60N 2/643* (2013.01);
(Continued)

(58) Field of Classification Search
CPC ...... B60N 2/4228; B60N 2/667; B60N 2/427; B60N 2/66; B60N 2/68
See application file for complete search history.

(56) References Cited

U.S. PATENT DOCUMENTS 8,162,392 B2 * 4/2012 Humer ................. B60N 2/4228
297/216.12
8,727,438 B2 * 5/2014 Nitsuma .............. B60N 2/4228
297/216.14
(Continued)

FOREIGN PATENT DOCUMENTS

CN      1819787 A      8/2006
EP    2 581 260 A1     4/2013
(Continued)

OTHER PUBLICATIONS

Office Action issued in related application JP 2017-542761, dated Sep. 17, 2019, with machine generated English language translation, 8 pages.
(Continued)

*Primary Examiner* — Philip F Gabler
(74) *Attorney, Agent, or Firm* — Faegre Drinker Biddle & Reath LLP

(57) ABSTRACT

The present disclosure describes a seat frame including a waist portion supporting member having a smaller size while stably supporting a waist portion of an occupant. A vehicle seat frame serving as a frame for a vehicle seat includes a seat cushion frame forming a frame of a sitting part of the vehicle seat, a seatback frame forming a frame of a backrest part of the vehicle seat, and a waist portion supporting member coupled to a lower frame which is included in the seatback frame. The waist portion supporting member has a coupling region extending in the seat width direction, the coupling region being coupled to the lower frame, and a waist portion supporting region extending from
(Continued)

the coupling region toward the seat cushion frame and supporting a waist portion of an occupant. The waist portion supporting region is longer in the seat width direction than the coupling region.

17 Claims, 31 Drawing Sheets

(51) Int. Cl.
*B60N 2/68* (2006.01)
*B60N 2/64* (2006.01)
*B60N 2/90* (2018.01)
*B60N 2/66* (2006.01)

(52) U.S. Cl.
CPC .............. *B60N 2/66* (2013.01); *B60N 2/667* (2015.04); *B60N 2/68* (2013.01); *B60N 2/986* (2018.02)

(56) References Cited

U.S. PATENT DOCUMENTS

| | | | | |
|---|---|---|---|---|
| 8,814,269 | B2* | 8/2014 | Suzuki | B60N 2/4228 297/216.13 |
| 9,428,087 | B2* | 8/2016 | Adachi | B60N 2/4228 |
| 10,040,376 | B2* | 8/2018 | Kurihara | B60N 2/1615 |
| 2011/0148157 | A1* | 6/2011 | Braun-Fischer | B60N 2/4228 297/216.13 |
| 2011/0204604 | A1 | 8/2011 | Hoshi | |
| 2012/0292961 | A1 | 11/2012 | Nitsuma et al. | |
| 2014/0103626 | A1 | 4/2014 | Seki et al. | |
| 2015/0165939 | A1 | 6/2015 | Seki et al. | |
| 2015/0246627 | A1 | 9/2015 | Shimizu | |
| 2016/0325646 | A1 | 11/2016 | Tanabe et al. | |
| 2017/0008437 | A1 | 1/2017 | Tanabe et al. | |
| 2018/0162248 | A1 | 6/2018 | Tanabe et al. | |
| 2018/0290568 | A1* | 10/2018 | Kijima | B60N 2/68 |
| 2018/0290569 | A1* | 10/2018 | Kijima | B60N 2/68 |

FOREIGN PATENT DOCUMENTS

| | | |
|---|---|---|
| JP | 2011-173515 A | 9/2011 |
| JP | 2013-010452 A | 1/2013 |
| JP | 2015-051700 A | 3/2015 |
| JP | 2015-147431 A | 8/2015 |
| JP | 2015-163488 A | 9/2015 |
| WO | 2004/086909 A1 | 10/2004 |
| WO | 2011/081074 A1 | 7/2011 |
| WO | 2014/054553 A1 | 4/2014 |

OTHER PUBLICATIONS

Office Action issued in related application CN 201580083265.5, dated Apr. 2, 2020, with English language translation, 11 pages.
Office Action issued in related application JP 2019-132052, dated May 26, 2020, with machine generated English language translation, 10 pages.

* cited by examiner

SEAT FRAME

CROSS REFERENCE TO RELATED APPLICATIONS

This application is a National Stage Entry application of PCT Application No. PCT/JP2015/080829, filed Oct. 30, 2015, which claims the priority benefit of Japanese Patent Application No. JP 2015-197156, filed Oct. 2, 2015, the contents being incorporated herein by reference.

BACKGROUND

The present disclosure relates to a seat frame. In particular, the present disclosure relates to a seat frame including a waist portion supporting member that supports a waist portion of an occupant seated in a conveyance seat.

At the time of a rear surface collision where a vehicle collides with a rear portion of another vehicle such as an automobile or a vehicle collides with an obstacle, etc. at the time of driving backwards, an occupant seated in a conveyance seat radically tilts back due to inertia force, and a neck portion of the occupant may receive a great shock.

For example, Japanese Patent Publication JP 2011-173515 discloses a conveyance seat in which a waist portion supporting member that supports a waist portion of an occupant is provided in a seatback frame serving as a framework of a backrest part of the conveyance seat. In the conveyance seat in which the waist portion supporting member is provided in such a way, by suppressing the waist portion of the occupant from coming in backward by the waist portion supporting member at the time of rear surface collision and facilitating backward tilt of an upper body of the occupant, the upper body of the occupant sinks into the conveyance seat and a shock on a neck portion is effectively absorbed.

Due to a demand to improve fuel consumption of a vehicle, etc., a seat frame is desired to have a reduced weight. Even in a seat frame in which a waist portion supporting member is provided, while maintaining a function of stably supporting a waist portion of an occupant by the waist portion supporting member, a challenge is to downsize the waist portion supporting member to further reduce the weight.

SUMMARY

The present disclosure is achieved in consideration with the above challenges and an embodiment of the present disclosure provides a seat frame including a waist portion supporting member which is capable of being downsized while stably supporting a waist portion of an occupant.

The challenge is solved in an embodiment of a seat frame for a conveyance seat, including a seat cushion frame that forms a frame of a sitting part of the conveyance seat, a seatback frame that forms a frame of a backrest part of the conveyance seat, and a waist portion supporting member coupled to a lower frame which is included in the seatback frame. The waist portion supporting member has a coupling region extending in a seat width direction, the coupling region being coupled to the lower frame, and a waist portion supporting region extending from the coupling region toward the seat cushion frame and supporting a waist portion of an occupant. The waist portion supporting region is longer in the seat width direction than the coupling region.

With the above seat frame, while ensuring the size of the waist portion supporting region supporting the waist portion of the occupant in the waist portion supporting member, the coupling region coupling the waist portion supporting member to the seatback frame can be downsized. That is, with the above seat frame, by providing the waist portion supporting member which is capable of being downsized while stably supporting the waist portion of the occupant by a wide surface, the seat frame having a high shock absorbing property for rear surface collision, the seat frame whose weight is reduced can be implemented.

In the above seat frame, the waist portion supporting member may have a bent portion formed by bending at least one of end portions of the waist portion supporting member in the seat width direction to an inner side in the seat width direction. By doing so, rigidity of the waist portion supporting region supporting the waist portion of the occupant in the waist portion supporting member can be improved. That is, with the above seat frame, by more stably supporting the waist portion of the occupant, the shock absorbing property for rear surface collision can be improved.

In the above seat frame, the bent portion may have an extending region that extends toward the lower frame. By doing so, in a case where a load is applied to the waist portion supporting region supporting the waist portion of the occupant in the waist portion supporting member, by abutting the extending region of the bent portion with the lower frame to deform the extending region, a shock can be absorbed by the bent portion. That is, with the above seat frame, by improving a shock absorbing property by the waist portion supporting member, the shock absorbing property for rear surface collision can be improved.

In the above seat frame, the waist portion supporting member may have a cutout portion formed around a connection portion between the waist portion supporting region and the bent portion. By doing so, at the time of forming the bent portion in the waist portion supporting member, deformation of the waist portion supporting region supporting the waist portion of the occupant can be suppressed. The bent portion can also be more precisely formed. That is, with the above seat frame, by the waist portion supporting region capable of more stably supporting the waist portion of the occupant and enhancing the rigidity more, the shock absorbing property for rear surface collision can be improved.

In the above seat frame, the connection portion may have a reinforcing region formed in a shape that projects toward the lower frame. By doing so, rigidity of the connection portion connecting the waist portion supporting region and the bent portion can be enhanced. Thereby, in a case where a load is applied to the waist portion supporting region, the extending region of the bent portion can be highly precisely abutted with the lower frame. Thus, a shock absorbing property of the bent portion can be improved.

In the above seat frame, the bent portion has a member attachment portion to which a member is attached. By doing so, a space in the seat outer side direction from the bent portion can be effectively utilized. Thereby, space utilization efficiency inside the conveyance seat is improved. Thus, a size increase in the conveyance seat can be suppressed.

In the above seat frame, the lower frame has a forward extending region that extends to face the extending region of the bent portion in a lower portion of the lower frame. By doing so, at the time of the waist portion supporting region receiving a load, the extending region of the bent portion extending on the seat rear side and the forward extending region of the lower frame extending on the seat front side are easily abutted with each other. Thus, the load received by the waist portion supporting region is easily transmitted to the lower frame.

In the above seat frame, the lower frame has a bead portion that extends in the seat width direction and projects toward the sitting part, the extending region of the bent portion has a recessed portion recessed toward the sitting part, and the recessed portion and the bead portion are arranged at positions to face each other. By doing so, contact between the bead portion of the lower frame projecting on the seat front side and the bent portion is suppressed. Thus, a size increase in the seat frame can be suppressed.

In the above seat frame, the waist portion supporting member is formed in a shape that spreads in the seat width direction from the coupling region toward the waist portion supporting region. By doing so, the load received by the waist portion supporting region can be efficiently divided to the coupling region. Since the waist portion supporting region and the coupling region are stably connected, the rigidity of the waist portion supporting region can be enhanced.

In the above seat frame, the waist portion supporting member has a region formed with a recessed and projected edge in a lower portion of the waist portion supporting region. By doing so, weight of the waist portion supporting member can be reduced, and the weight of the seat frame can also be reduced.

According to an embodiment of the present disclosure, the seat frame having a high shock absorbing property for rear surface collision, the seat frame whose weight is reduced can be implemented.

According to an embodiment of the present disclosure, the waist portion of the occupant is more stably supported, so that the shock absorbing property for rear surface collision can be improved.

According to an embodiment of the present disclosure, the shock absorbing property by the waist portion supporting member is improved, so that the shock absorbing property for rear surface collision can be improved.

According to an embodiment of the present disclosure, the waist portion supporting region is capable of more stably supporting the waist portion of the occupant and the rigidity is more enhanced. Thus, the shock absorbing property for rear surface collision can be improved.

According to an embodiment of the present disclosure, the extending region of the bent portion precisely abuts the lower frame, so that the shock absorbing property of the bent portion can be improved.

According to an embodiment of the present disclosure, the space utilization efficiency inside the conveyance seat is improved, so that the size increase in the conveyance seat can be suppressed.

According to an embodiment of the present disclosure, the load received by the waist portion supporting region is easily transmitted to the lower frame.

According to an embodiment of the present disclosure, the contact between the bead portion of the lower frame projecting on the seat front side and the bent portion is suppressed, so that the size increase in the seat frame can be suppressed.

According to an embodiment of the present disclosure, the load received by the waist portion supporting region is efficiently divided to the coupling region, so that the rigidity of the waist portion supporting region can be enhanced.

According to an embodiment of the present disclosure, the weight of the waist portion supporting member can be reduced, and the weight of the seat frame can also be reduced.

BRIEF DESCRIPTION OF DRAWINGS

Various embodiments of the invention are illustrated in the drawings, in which.

DETAILED DESCRIPTION

The present disclosure relates to an embodiment of a seat frame for a conveyance seat, including a seat cushion frame that forms a frame of a sitting part of the conveyance seat, a seatback frame that forms a frame of a backrest part of the conveyance seat, and a waist portion supporting member coupled to a lower frame which is included in the seatback frame. The waist portion supporting member has a coupling region that extends in the seat width direction, the coupling region being coupled to the lower frame, and a waist portion supporting region that extends from the coupling region toward the seat cushion frame and supports a waist portion of an occupant, and the waist portion supporting region is longer in the seat width direction than the coupling region. In the following embodiment, a case where the seat frame according to the present disclosure is applied to a seat frame for a vehicle (hereinafter, referred to as the vehicle seat frame) is described.

Hereinafter, a vehicle seat according to the embodiment of the present disclosure and a vehicle seat frame that forms a frame of the vehicle seat is described with reference to FIGS. 1 to 16.

In the following description, the "front to back direction" indicates the front to back direction when seen from a seated person of the vehicle seat, the direction matching with the driving direction of a vehicle. The "seat width direction" indicates the lateral direction of the vehicle seat, matching with the right and left direction when seen from the seated person of the vehicle seat. The "height" direction indicates the height direction of the vehicle seat, matching with the up and down direction when the vehicle seat is seen from the front.

Configuration of Vehicle Seat S

Figure 1:
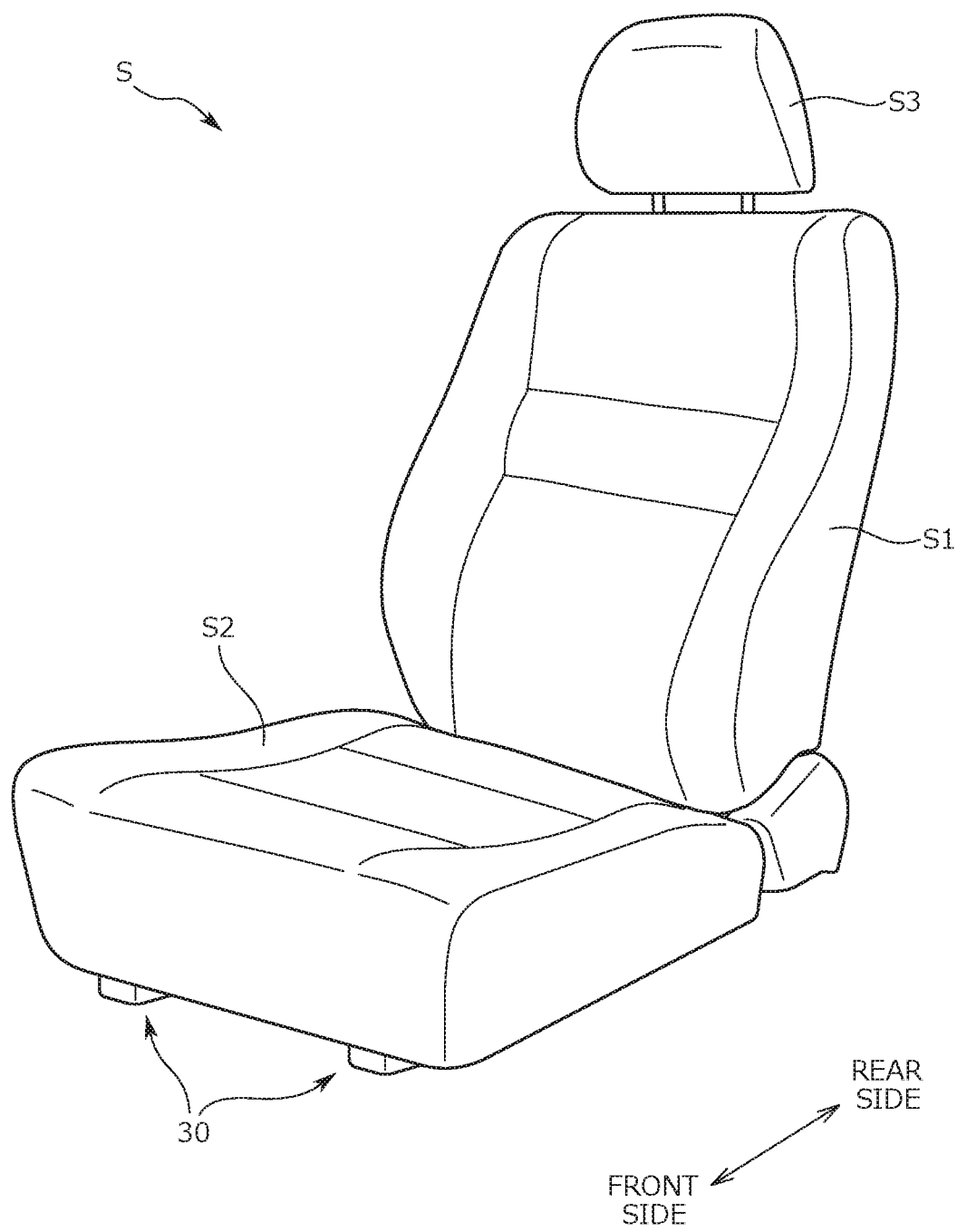
FIG. 1 is a perspective view of a vehicle seat.

Firstly, based on FIG. 1, a basic configuration of a vehicle seat S according to a first embodiment is described. As shown in FIG. 1, the vehicle seat S has a seatback S1, a seat cushion S2, and a headrest S3. In a lower portion of the seat cushion S2, slide rail mechanisms 30 for slidingly moving a seat main body (major portion of the vehicle seat S) in the front to back direction are provided.

Figure 2:
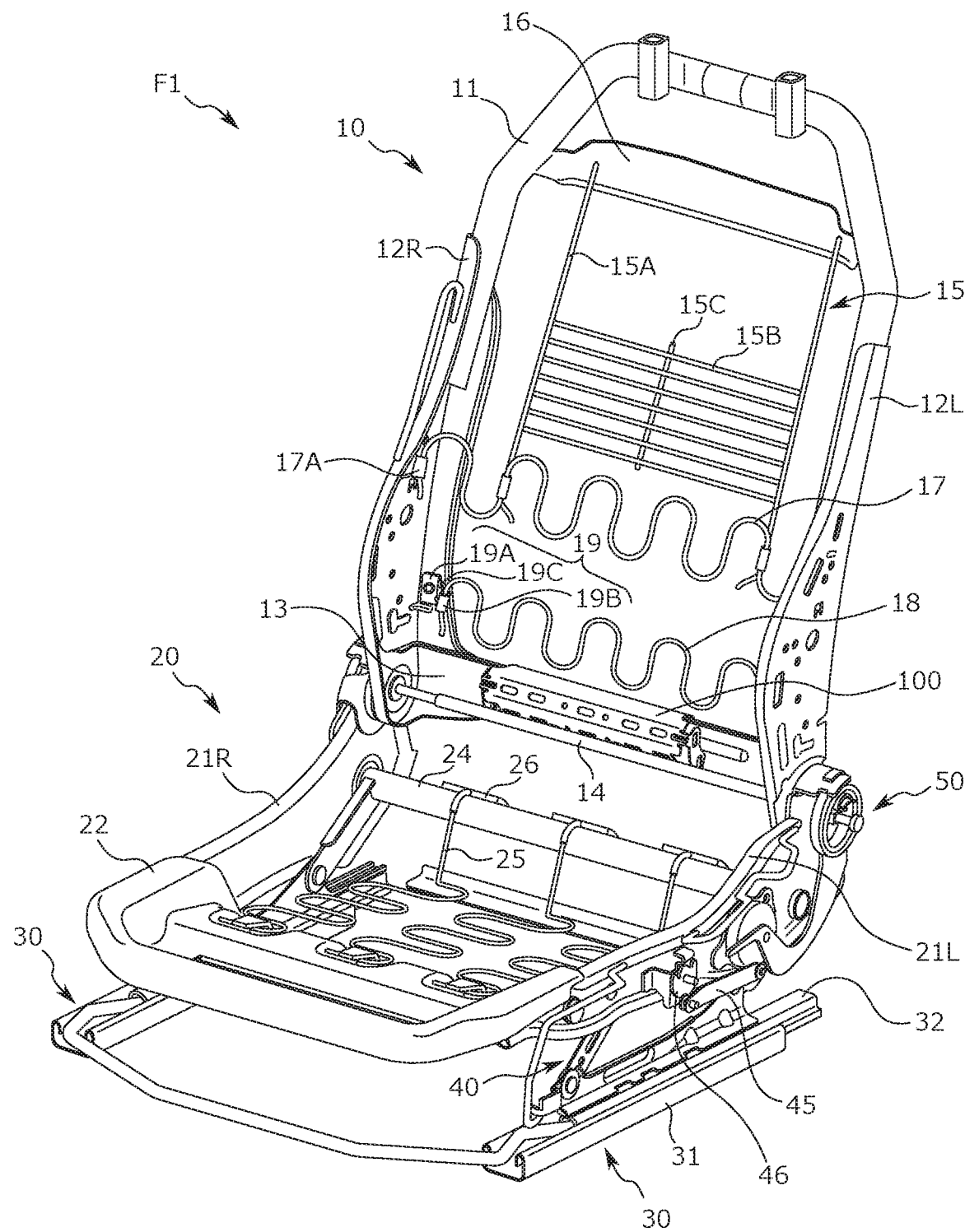
FIG. 2 is perspective view of a vehicle seat frame according to a first embodiment.
Figure 3:
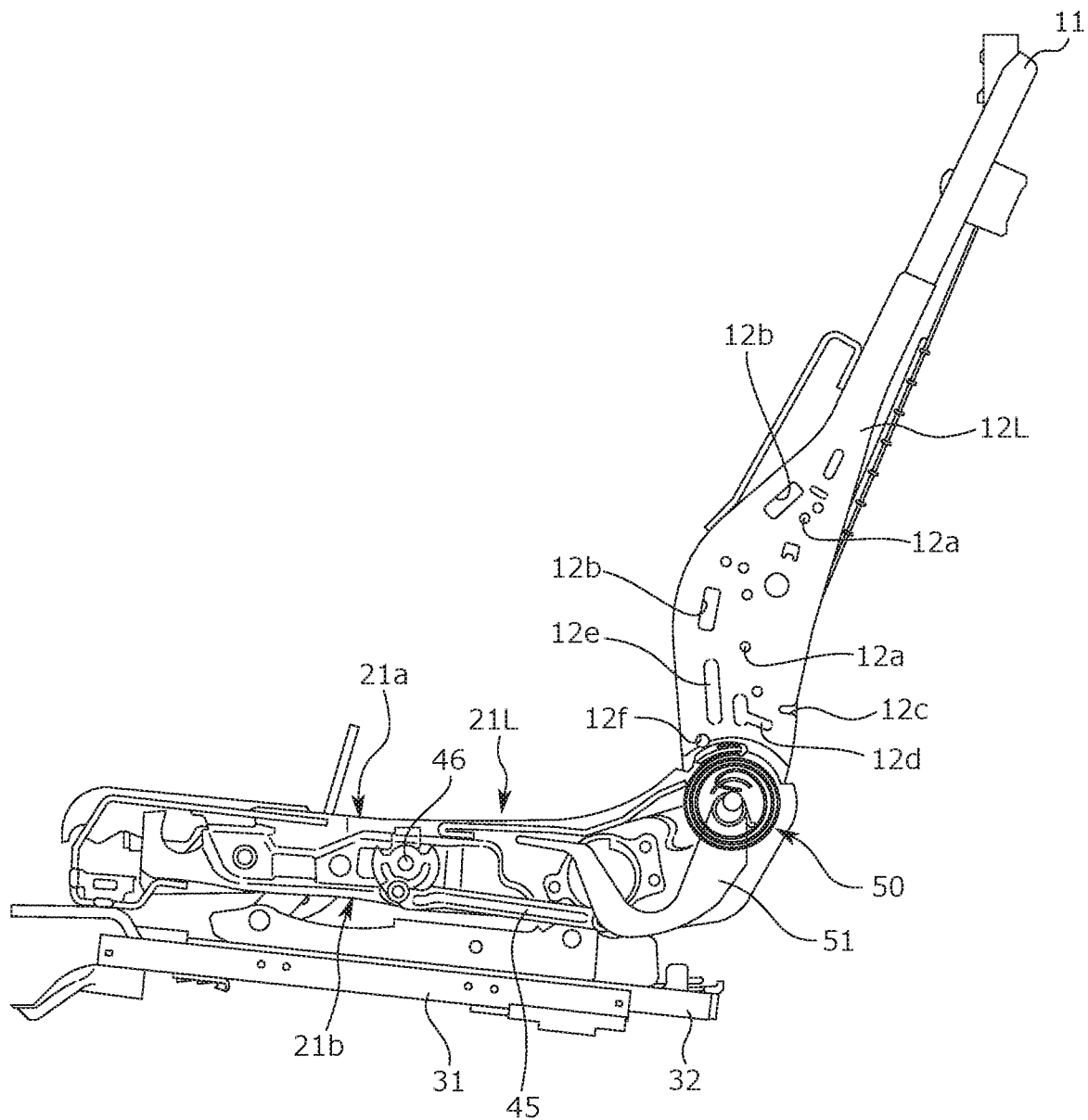
FIG. 3 is a left side view of the vehicle seat frame according to the first embodiment.
Figure 4:
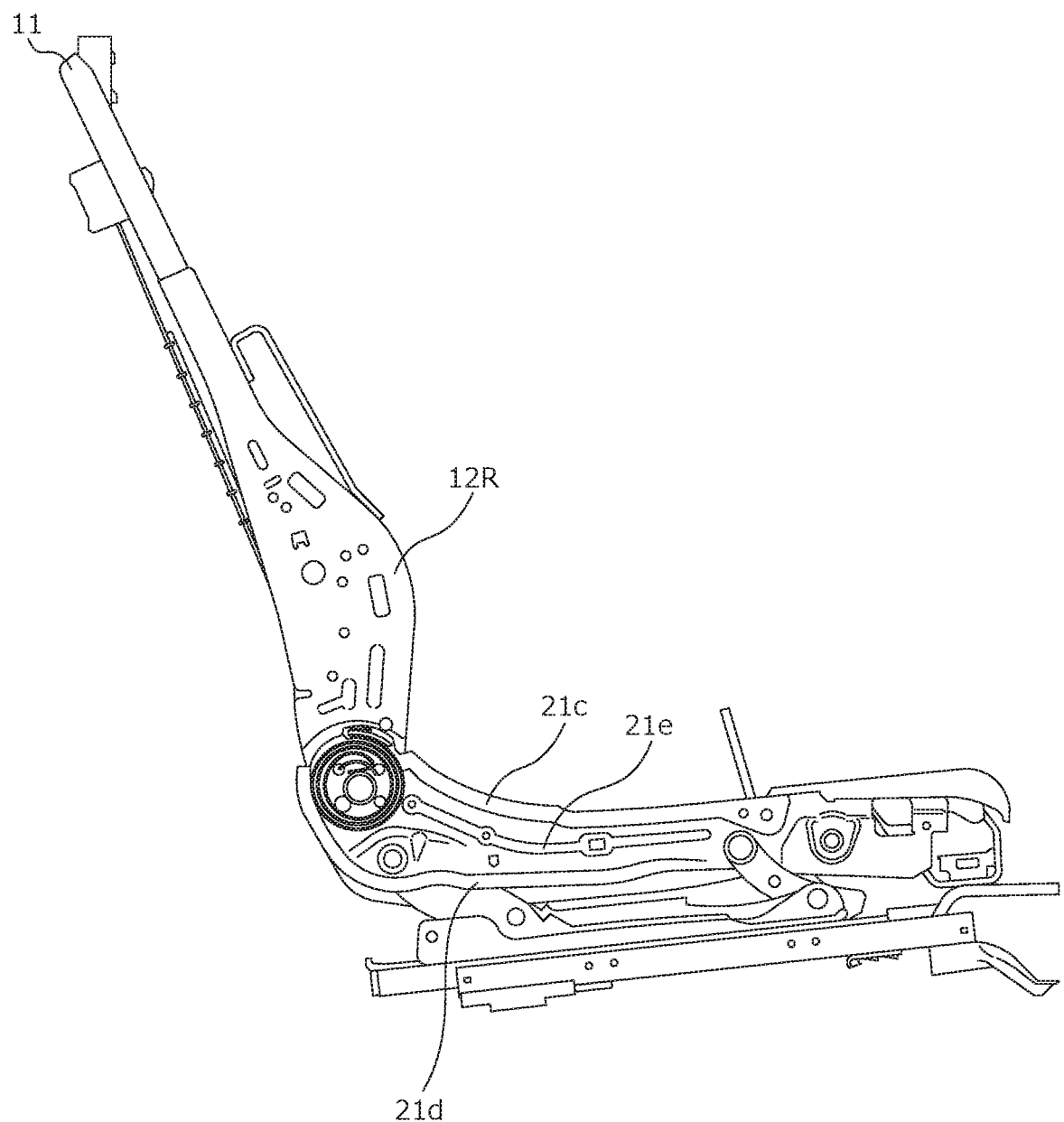
FIG. 4 is a right side view of the vehicle seat frame according to the first embodiment.

The vehicle seat S has a vehicle seat frame F1 shown in FIG. 2 as a framework thereof. FIG. 3 shows a left side view of the vehicle seat frame F1, and FIG. 4 shows a right side view of the vehicle seat frame F1. Hereinafter, with reference to FIGS. 2 to 4, a configuration of the vehicle seat frame F1 is described.

Configuration of Vehicle Seat Frame F1

As shown in FIG. 2, the vehicle seat frame F1 includes major constituent elements including a seatback frame 10 and a seat cushion frame 20.

The seatback frame 10 has an inverted-U-shaped upper frame 11, a seatback side frame 12L serving as a left end portion in the seat width direction, a seatback side frame 12R serving as a right end portion in the seat width direction, and a lower frame 13 bridged between lower end portions of the seatback side frame 12L and the seatback side frame 12R. Between the lower end portions of the seatback side frame 12L and the seatback side frame 12R, a reclining shaft 14 of a reclining mechanism 50 is set in a state of passing through the seatback side frame 12L and the seatback side frame 12R. By operating a reclining operation portion 51, the reclining mechanism 50 is activated, so that an angle of the seatback frame 10 can be adjusted.

S springs 17, 18 serving as pressure receiving members are respectively bridged between center portions and between lower portions of the seatback side frame 12L and the seatback side frame 12R. Right and left end portions of the lower S spring 18 are locked onto hook portions 19B of S spring hook brackets 19 provided respectively in the seatback side frames 12L, 12R. Each of the S spring hook brackets 19 is fixed to the seatback side frame by a fixing portion 19A, and a welding bead is formed from the fixing portion 19A toward the hook portion 19B, so that rigidity of the S spring hook bracket is enhanced. Right and left end portions of the center-side S spring 17 are locked onto locking portions 17A provided respectively in the seatback side frames 12L, 12R.

A pressure receiving member 15 that supports the back of a seated person of the vehicle seat S from the rear side is provided between the seatback side frame 12L and the seatback side frame 12R. This pressure receiving member 15 is formed by a planar spring (Pullmaflex®) and held in a state where the pressure receiving member is hung onto an upper cross member 16 coupling both end portions of the upper frame 11 by wires, etc. Specifically speaking, the pressure receiving member 15 is formed by a pair of right and left side wires 15A, plural cross wires 15B extended between the side wires 15A, and a center wire 15C arranged in center portions of the cross wires 15B in parallel to the side wires 15A. Upper end portions of the side wires 15A are attached to the upper cross member 16, and lower end portions of the side wires 15A are attached to and held by the S spring 17.

By combining the pressure receiving member 15 to the S spring 17 as described above, a pressure receiving characteristic of the S spring 17 can be actively utilized over a wide range including the pressure receiving member 15 while reducing the number of parts.

As shown in FIG. 2, a waist portion supporting member 100 that supports a waist portion of an occupant seated in the vehicle seat S is attached to a center part of the lower frame 13. By suppressing the waist portion of the occupant from coming in backward at the time of rear surface collision and facilitating backward tilt of an upper body of the occupant, this waist portion supporting member 100 performs a function of letting the upper body of the occupant sink into the vehicle seat S and effectively absorbing a shock on a neck portion. Details of a shape of the waist portion supporting member 100 and a configuration of coupling with the lower frame 13 are described below.

Next, the seat cushion frame 20 serving as a framework of a sitting part of the vehicle seat S is described. As shown in FIG. 2, the seat cushion frame 20 has an outer shape of a square frame when seen from the upper side, and includes major constituent elements of a cushion side frame 21L positioned in a left end portion in the seat width direction, a cushion side frame 21R positioned in a right end portion in the seat width direction, and a pan frame 22 forming a front end portion of the seat cushion frame 20. An upper part of a rear end portion of the cushion side frame 21L is attached to a lower end portion of the seatback side frame 12L via a coupling bracket.

Lower parts of rear end portions of the cushion side frame 21L and the cushion side frame 21R are coupled to each other by a member extending along the seat width direction as shown in FIG. 2. This member is a coupling pipe 24 serving as a hollow member, specifically, a round pipe. Both end portions in the seat width direction of the coupling pipes 24 are supported by the cushion side frame 21L and the cushion side frame 21R via end portion sleeves serving as tubular members.

Plural S springs 25 serving as bottom portion supporting members are provided between the cushion side frame 21L and the cushion side frame 21R and placed side by side in the seat width direction. The S springs 25 are provided for supporting a bottom portion of the occupant which is a seated person, and extend along in the front to back direction. Front end portions of the S springs 25 are fixed to an upper end surface of the pan frame 22. Rear end portions of the S springs 25 are secured to the above coupling pipe 24 by engagement hooks 26 and L-angle-shaped fixing brackets 27 arranged between the cushion side frame 21L and the cushion side frame 21R.

The vehicle seat S also includes a height adjustment mechanism 40 configured to adjust a height of the seat cushion S2. This height adjustment mechanism 40 is arranged between the seat cushion frame 20 and upper rails 32 of the slide rail mechanisms 30. Each of the slide rail mechanisms 30 includes a lower rail 31 and the upper rail 32. By the upper rails 32 to which the seat cushion frame 20 is coupled sliding with respect to the lower rails 31, the vehicle seat frame F1 is movable in the front to back direction. By the occupant operating a height adjustment operation portion 46, height of the seat main body including the seat cushion S2 is adjusted by the height adjustment mechanism 40.

A left side surface shape of the vehicle seat frame F1 is described based on FIG. 3. As shown in FIG. 3, a side surface of the seatback side frame 12L is formed in a shape that extends to become wider from a coupling point to the upper frame 11 toward a coupling point to the seat cushion frame 20. Plural holes including airbag attachment holes 12a and stay cloth clip attachment holes 12b are formed on the side surface of the seatback side frame 12L.

An airbag module is fastened to the air bag attachment holes 12a by bolts. Clips are attached to a stay cloth at two points in a lower portion on one side in the seat width direction at the time of attachment. By respectively attaching the two clips attached to the stay cloth to the stay cloth clip attachment holes 12b at two points of the seatback side frame 12L, the stay cloth is fixed to the seatback frame 10. Since the airbag attachment holes 12a and the stay cloth clip attachment holes 12b are arranged close to each other, an airbag can be efficiently deployed in the stay cloth. Therefore, the airbag is promptly deployed in the direction guided by the stay cloth.

Plural fragile portions are formed around a lower side end portion of the seatback side frame 12L. The fragile portions are points where strength is lowered in order to promote deformation of the frame. In the present embodiment, the fragile portions are made as holes formed in a bead-like shape recessed to the seat inner side from an outer peripheral surface of the seatback side frame 12L or in a frame. By providing such fragile portions in the seatback side frame, the seatback side frame is deformed at points of the fragile portions at the time of rear surface collision, so that a shock is efficiently absorbed.

As shown in FIG. 3, a bead portion 12c extending in the seat width direction from the side surface of the seatback side frame 12L (12R) to a back surface, the bead portion being recessed to the seat inner side functions as the fragile portion. A hole provided on the seat upper side of the bead portion on the back surface of the seatback side frame 12L (12R) also functions as the fragile portion. A hole 12f provided around a seat lower side end portion on the side surface of the seatback side frame 12L (12R) also functions as the fragile portion.

The S spring hook bracket 19 is provided on the upper side of a bead portion 12c functioning as the fragile portion. By applying a load of the occupant to the S spring hook bracket 19 at the time of rear surface collision, deformation easily occurs at the point of the bead portion 12c functioning as the fragile portion. Thereby, a shock absorbing property can be improved.

Reinforcing portions for improving strength are formed in the seatback side frame 12L (12R), so that strength of selected parts is ensured. For example, a substantially L-shaped bead portion 12d provided on the side surface of the seatback side frame 12L (12R) functions as the reinforcing portion. A substantially I-shaped bead portion 12e provided on the seat front side of the bead portion 12d on the side surface of the seatback side frame 12L (12R) also functions as the reinforcing portion.

As shown in FIG. 3, bead portions 21a, 21b extending from a center portion to a front portion (regions projected to the seat outer side) are provided respectively in an upper side end portion and in a lower side end portion on the side surface of the seatback side frame 12L. The height adjustment operation portion 46 of the height adjustment mechanism 40 is arranged between the upper bead portion 21a and the lower bead portion 21b. In such a way, by effectively utilizing a space between the upper bead portion 21a and the lower bead portion 21b, the vehicle seat S can be compactly formed.

Next, a right side surface shape of the vehicle seat frame F1 is described based on FIG. 4. Since a side surface of the seatback side frame 12R is the same as the side surface of the seatback side frame 12L, description thereof is omitted, and a side surface shape of the cushion side frame 21R is described below.

As shown in FIG. 4, on the side surface of the cushion side frame 21R, bead portions 21c, 21d extending from a center portion to a rear side portion are provided respectively in an upper side end portion and in a lower side end portion. A distance between the upper bead portion 21c and the lower bead portion 21d is gradually enlarged from the seat front side to the seat rear side. A bead portion 21e formed in a shape of three connected holes is provided between the upper bead portion 21c and the lower bead portion 21d. The three holes provided in the bead portion 21e may be used for attachment of members. In such a way, by forming the holes for attachment of members in the bead portion 21e, rigidity of a member attachment part of the cushion side frame 21R can be improved.

Configuration of Waist Portion Supporting Member 100

Next, with reference to FIGS. 5 to 11, the details of the configuration of the waist portion supporting member 100 provided in the vehicle seat frame F1 according to the present embodiment is described. In the following description, the directions of portions of the waist portion supporting member 100 corresponds to the direction at the time of attaching the waist portion supporting member 100 to the lower frame 13.

Figure 5:
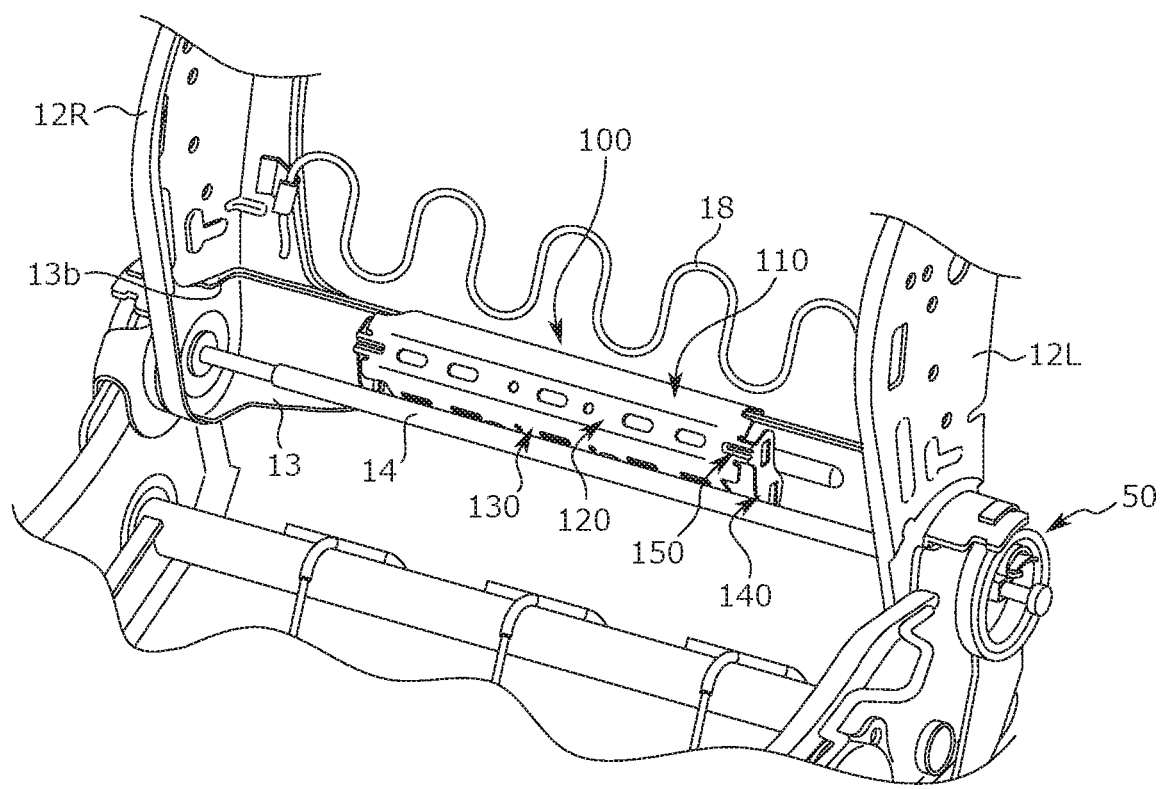
FIG. 5 is an enlarged view of major portions of FIG. 2, the enlarged view of an attachment part of a waist portion supporting member.
Figure 6:
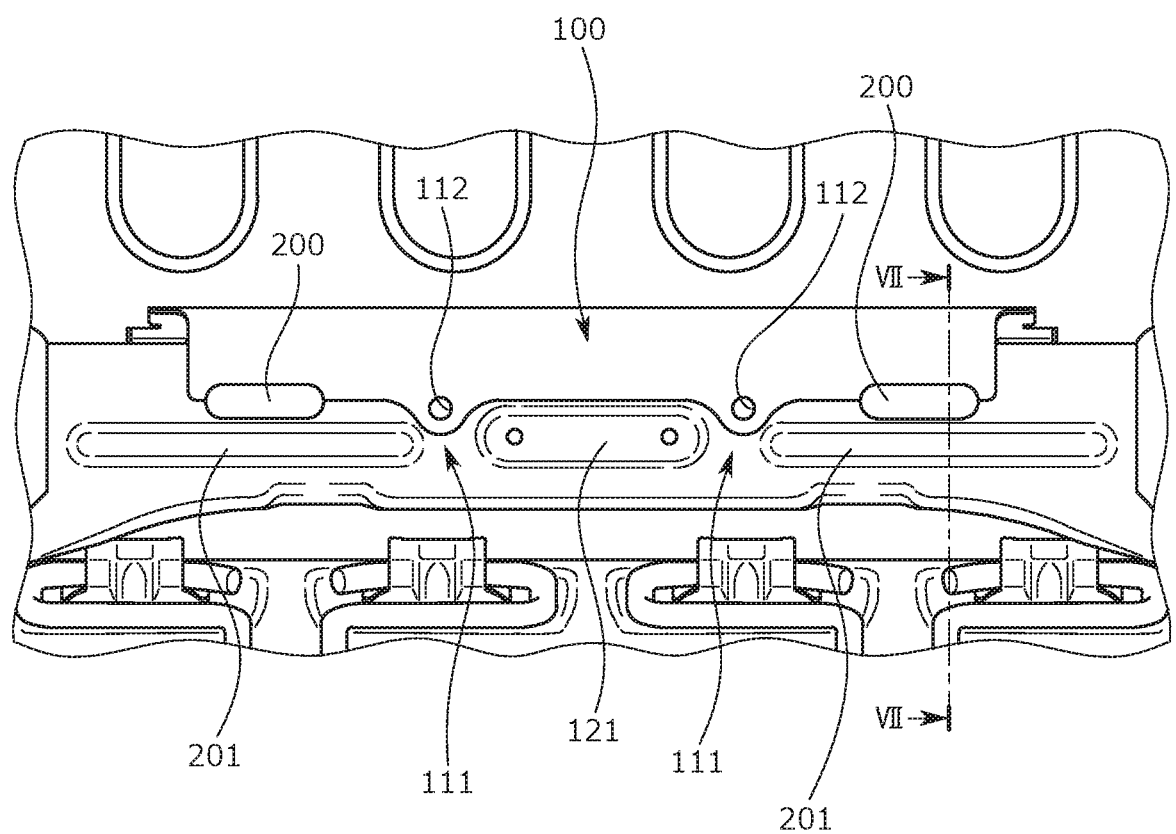
FIG. 6 is a back view of the attachment part of the waist portion supporting member.
Figure 7:
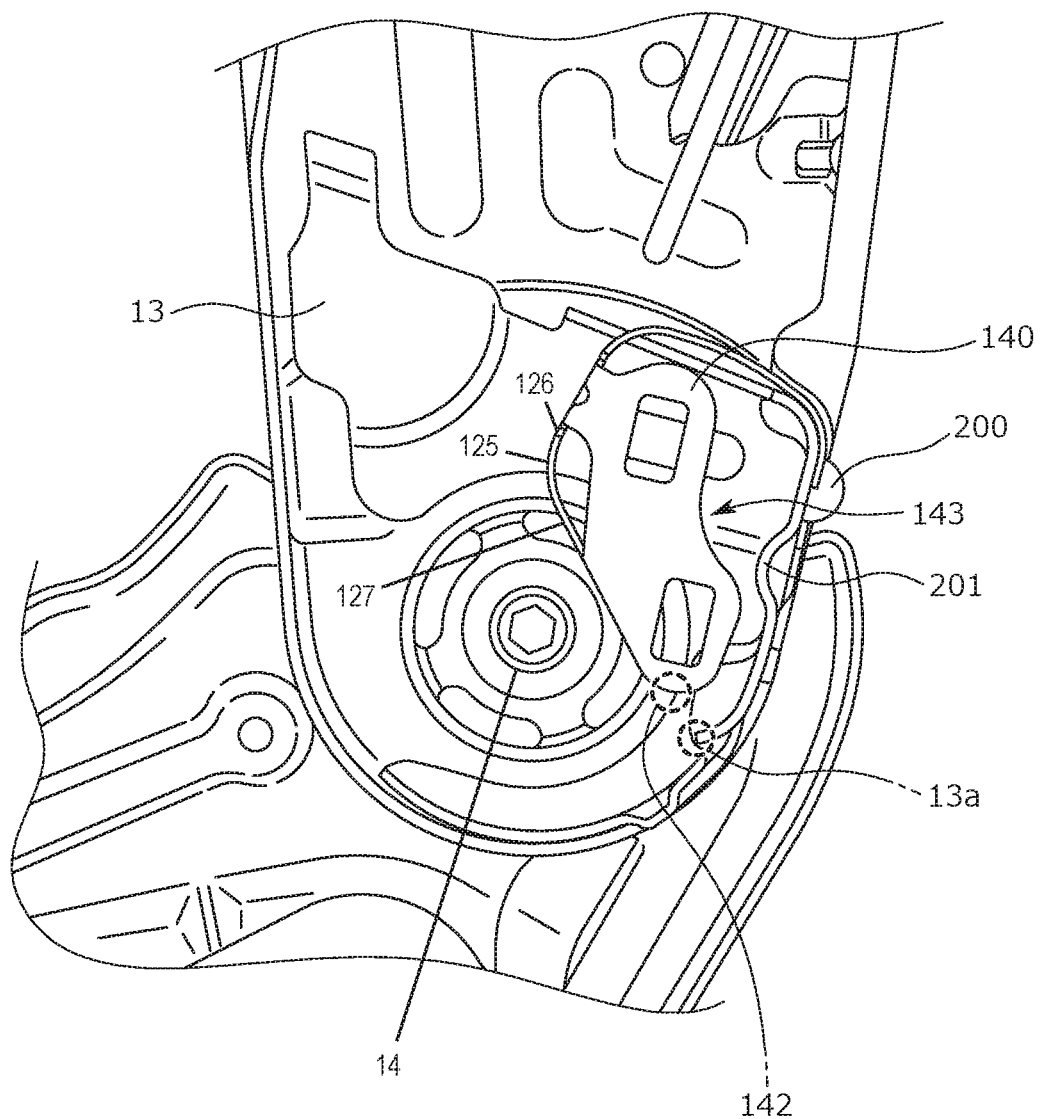
FIG. 7 is a cross-sectional view of the attachment part of the waist portion supporting member.
Figure 8:
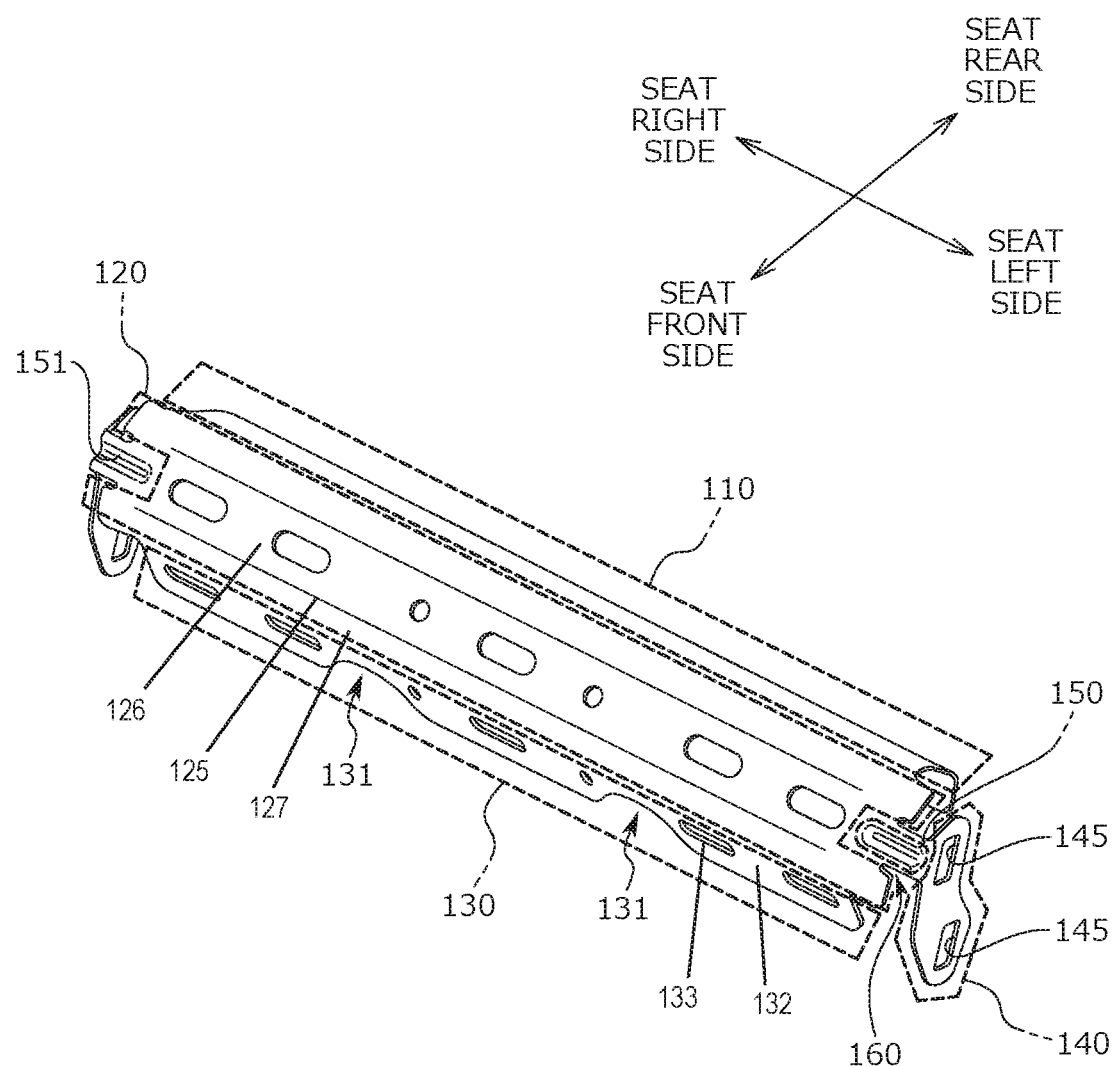
FIG. 8 is a perspective view of the waist portion supporting member.
Figure 9:
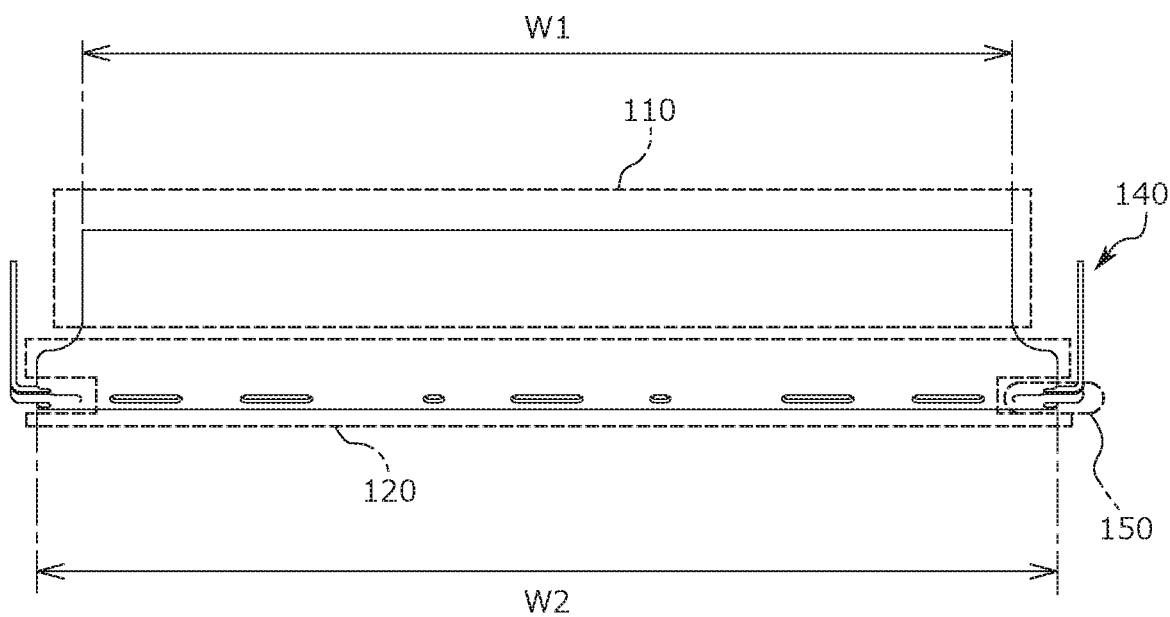
FIG. 9 is an upper surface view of the waist portion supporting member.
Figure 10:
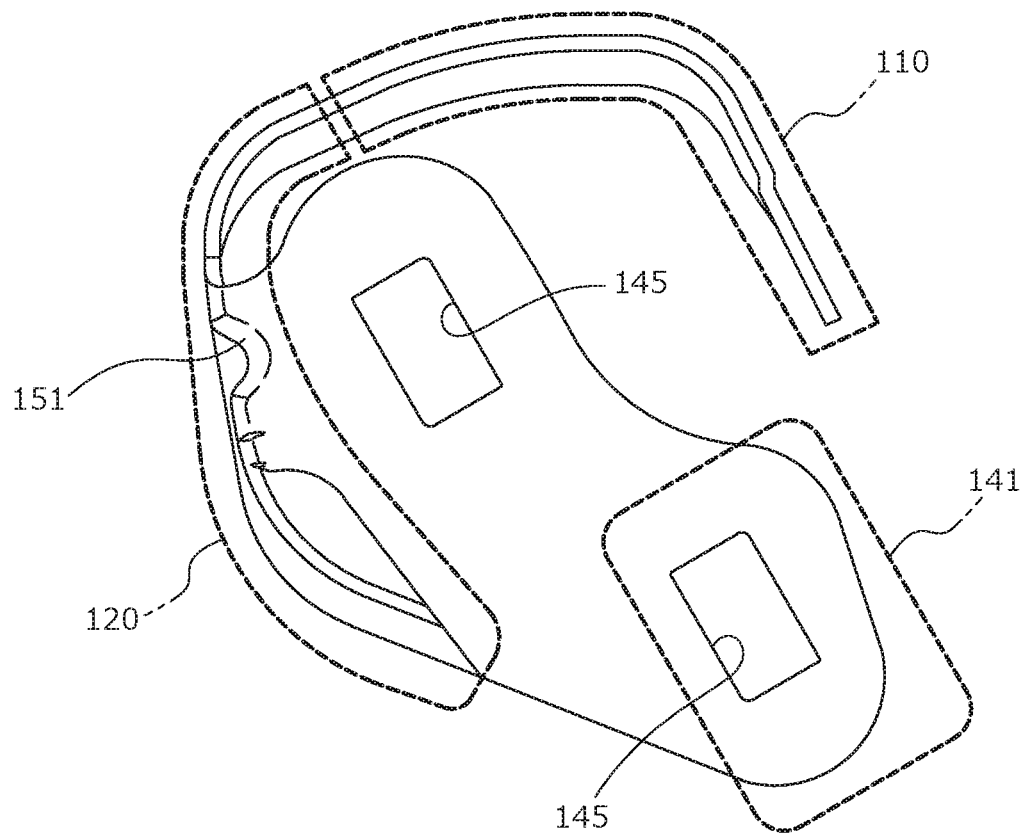
FIG. 10 is a side view of the waist portion supporting member.
Figure 11:
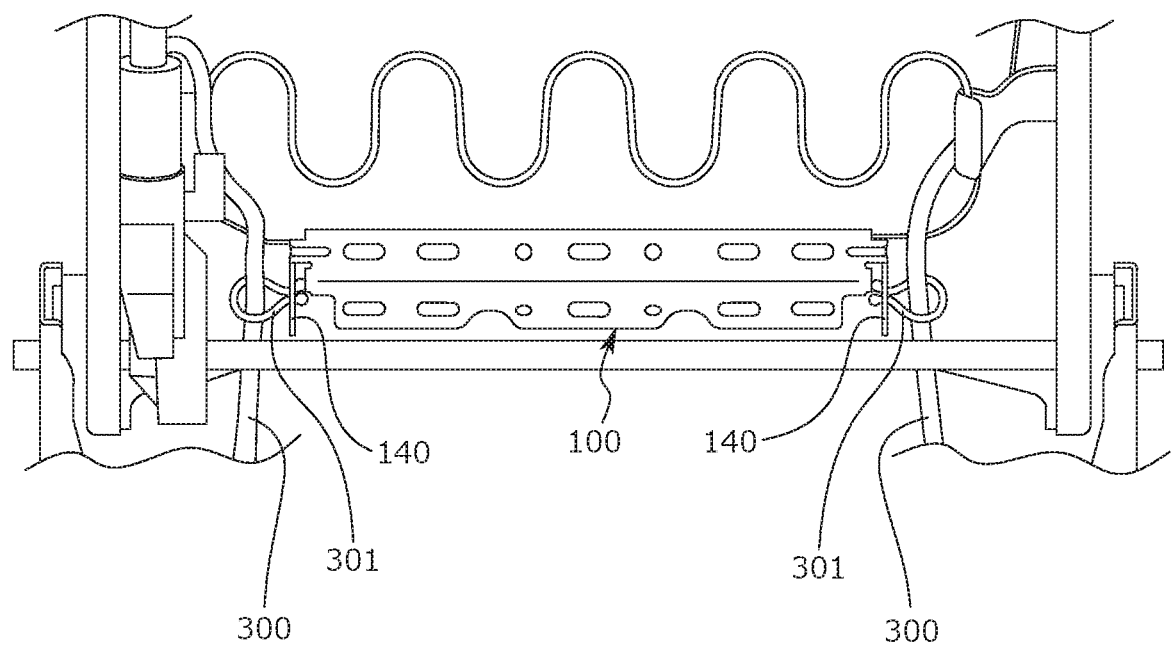
FIG. 11 is a front view showing a state where a wire harness is attached to the waist portion supporting member.

FIG. 5 is an enlarged view of major portions of FIG. 2, showing a coupling point of the waist portion supporting member 100 and the lower frame 13. FIG. 6 is a back view of the coupling point of the waist portion supporting member 100 and the lower frame 13. FIG. 7 is a cross-sectional view taken along the line VII-VII in FIG. 6. FIG. 8 is a perspective view of the waist portion supporting member 100. FIG. 9 is an upper surface view of the waist portion supporting member 100. FIG. 10 is a side view of the waist portion supporting member 100. FIG. 11 shows a configuration example in a case where a wire harness is attached to the waist portion supporting member 100.

As shown in FIG. 5, the waist portion supporting member 100 is attached to the lower frame 13 in such a manner that a surface supporting the waist portion (waist portion supporting region 120) is placed between the reclining shaft 14 and the lower frame 13 in the seat front to back direction. In such a way, by arranging the waist portion supporting member 100 on the rear side of the reclining shaft 14, even in a case where the waist portion supporting member 100 is warped in a normal seating state, contact with the reclining shaft 14 can be prevented. Thus, generation of a contact sound can be suppressed.

As shown in FIG. 5, a flange portion 13b of the lower frame 13 extends in the seat width direction from a part where the lower frame 13 is connected to the seatback side frame 12L to a part where the lower frame 13 is connected to the seatback side frame 12R. End portions of the flange portion 13b are positioned respectively in the vicinity of upper portions of parts where the reclining shaft 14 passes through the lower frame 13.

As shown in FIGS. 8 to 10, the waist portion supporting member 100 has a coupling region 110 coupled to the lower frame 13 (the coupling region 110 extending in the seat width direction), the waist portion supporting region 120 extending from the coupling region 110 to the seat front side and supporting the waist portion of the occupant, a rearward extending region 130 extending from the waist portion supporting region 120 to the seat rear side, bent portions 140 formed by bending end portions in the seat width direction of the waist portion supporting member 100 to the inner side in the seat width direction, and connection portions 150 connecting the waist portion supporting region 120 and the bent portions 140. Hereinafter, details of the portions of the waist portion supporting member 100 are described.

Firstly, a configuration of the coupling region 110 in the waist portion supporting member 100 is described. As shown in FIG. 9, length W1 in the seat width direction of the coupling region 110 is shorter than length W2 in the seat width direction of the waist portion supporting region 120. In other words, the length W2 in the seat width direction of the waist portion supporting region 120 is longer than the length W1 in the seat width direction of the coupling region 110.

In such a way, by making the length in the seat width direction of the waist portion supporting region 120 longer than the length in the seat width direction of the coupling region 110, the coupling region 110 can be downsized while sufficiently ensuring a surface of the waist portion supporting region 120 and stably supporting the waist portion of the occupant. That is, with the above configuration, while holding a waist portion supporting function of the waist portion supporting member 100, the part attached to the lower frame 13 can be downsized, and thereby, the whole weight can be reduced.

As shown in FIG. 9, in a case where the waist portion supporting member 100 is seen from the seat upper side, the waist portion supporting member is formed in a shape of spreading widthwise (width in the seat width direction) from the coupling region 110 toward the waist portion supporting region 120 (for example, a flare shape). By forming the coupling region 110 and the waist portion supporting region 120 in such a shape, the coupling region 110 can stably support the waist portion supporting region 120, and a load of the occupant received by the waist portion supporting region 120 can be divided in a well-balanced manner and transmitted to the coupling region 110.

As shown in FIG. 10, the coupling region 110 is formed in a substantially L-like shape formed by bending a seat rear side portion to be bent to the seat lower side. As shown in FIGS. 6 and 7, the coupling region 110 is welded and fixed to the lower frame 13 in the lower side end portion bent to the seat lower side.

As shown in FIGS. 6 and 7, on the rear surface side of the coupling region 110, projected portions 111 projected towards the seat lower side are formed in the seat lower side end portion at positions on both sides of a bead portion 121 projecting to the seat outer side of the lower frame 13. Respectively for the projected portions 111, positioning holes 112 for determining a coupling position of the coupling region 110 and the lower frame 13 are formed. The lower side end portion of the coupling region 110 is welded and fixed for example by arc welding at welded portions 200 positioned above bead portions 201 which are recessed to the seat inner side of the lower frame 13. Welding is not limited to arc welding but other welding methods such as laser welding may be used. Further, as shown in FIG. 6, in the present embodiment, the welded portions 200 and the positioning holes 112 are provided to be positioned on the substantially straight line in the seat width direction.

Next, a configuration of the waist portion supporting region 120 in the waist portion supporting member 100 is described. As shown in FIG. 5, the waist portion supporting region 120 is a part which is the surface supporting the waist portion at the time of attaching the waist portion supporting member 100 to the lower frame 13. As shown in FIG. 8, by forming plural circular and substantially oval holes in the waist portion supporting region 120, weight of the waist portion supporting member 100 is reduced.

The bent portions 140 and the connection portions 150 are provided in end portions in the seat width direction of the waist portion supporting region 120. As shown in FIG. 8, cutout portions 160 are provided around the connection portions 150 (that is, in the seat front to back direction). By providing the cutout portions 160, deformation of the surface of the waist portion supporting region 120 is suppressed at the time of bending the bent portions 140 to the inner side in the seat width direction.

As shown in FIGS. 8 and 10, bead-shaped reinforcing portions 151 projected towards the inner side of the waist portion supporting member 100, that is, toward the lower frame 13, are provided in the connection portions 150. By providing the reinforcing portions 151, rigidity of the connection portions 150 is strengthened.

Next, a configuration of the bent portions 140 in the waist portion supporting member 100 is described. As shown in FIG. 9, the bent portions 140 are connected on the outer sides in the seat width direction of the connection portions 150, and formed by bending connection points to the connection portions 150 substantially perpendicularly rearward. As shown in FIGS. 7 and 10, each of the bent portions 140 has a bent portion rearward extending region 141 extending toward the seat rear side, that is, toward the lower frame 13.

As shown in FIG. 7, a lower frame lower end portion 13a serving as an end portion of the lower frame 13 on the seat lower side is positioned on the seat lower side of a bent portion lower end portion 142 serving as an end portion of the bent portion 140 on the seat lower side in the bent portion rearward extending region 141 of the bent portion 140, and extends toward the seat front side, that is, toward the waist portion supporting member 100. In such a way, as shown in FIG. 7, the bent portion rearward extending region 141 and a forward extending region 13c of a seat lower portion of the lower frame 13 are arranged to be separated from each other at positions to face each other.

In such a way, the bent portion rearward extending region 141 is arranged at a position where the region does not abut the forward extending region 13c of the lower frame 13 at a normal time. However, at the time of rear surface collision, due to application of a load of the occupant to the waist portion supporting region 120, the bent portion rearward extending region 141 abuts the forward extending region 13c of the lower frame 13, and the bent portion 140 is deformed. Thereby, a shock is absorbed by the bent portion 140 at the time of rear surface collision.

As shown in FIG. 7, along an edge on the seat rear side in the bent portion 140, a recessed portion 143 recessed toward the seat front side and a bead portion 201 projecting to the seat front side of the lower frame 13 are arranged to face each other. Thereby, abutment of the bead portion 201 of the lower frame 13 with the bent portion 140 at the normal time is suppressed. By doing so, the waist portion supporting member 100 and the lower frame 13 can be compactly formed. Thus, a size increase in the seat frame can be suppressed.

As shown in FIG. 10, holes (member attachment holes 145) for attaching some members forming the vehicle to the bent portion 140 are formed in the bent portion 140. In the present embodiment, two member attachment holes 145 are provided in the bent portion 140. However, the present disclosure is not limited to this but one or three or more member attachment holes 145 may be formed.

For example, as shown in FIG. 11, by engaging a clip for attaching a wire harness with the member attachment holes 145, the wire harness can be attached to the bent portion 140. In such a way, by providing the member attachment holes 145 capable of attaching the members to the bent portion 140, a space from the waist portion supporting member 100 to the seatback side frame 12L, 12R can be effectively utilized.

Next, the rearward extending region 130 in the waist portion supporting member 100 is described. As shown in FIG. 8, an end portion on the seat rear side of the rearward extending region 130 is positioned on the seat front side of an end portion on the seat rear side of the bent portion 140. At the normal time, the rearward extending portion 130 does not abut the lower frame 13. However, in a case where a strong shock is received at the time of rear surface collision, a load of the occupant is applied to the waist portion supporting region 120, and thereby, the bent portion 140 abuts the lower frame 13 and successively the rearward extending region 130 abuts the lower frame 13. The rearward extending region 130 has a wider surface to abut the lower frame 13 than the bent portion 140. Thus, by abutting the rearward extending region 130 with the lower frame 13 to support the waist portion supporting region 120 at the time of rear surface collision as described above, the waist portion of the occupant can be not coming into the rear side at the time of rear surface collision.

As shown in FIG. 8, by forming recessed portions 131 in an edge portion on the seat lower side of the rearward extending region 130, a recessed and projected edge portion is formed. Further, plural circular- and substantially-oval-shaped holes are formed on a surface of the rearward extending region 130. Thereby, weight of the waist portion supporting member 100 is reduced.

With the vehicle seat frame F1 according to the present embodiment described above, while ensuring the size of the waist portion supporting region 120 that supports the waist portion of the occupant in the waist portion supporting member 100, the coupling region 110 coupling the waist portion supporting member 100 to the seatback frame 10 can be downsized. That is, with the vehicle seat frame F1, by providing the waist portion supporting member 100 which is capable of being downsized while stably supporting the waist portion of the occupant on the wide surface, a seat frame having a high shock absorbing property for rear surface collision, the seat frame whose weight is reduced can be realized.

The bent portions 140 are provided in the end portions in the seat width direction of the waist portion supporting member 100. Thereby, rigidity of the waist portion supporting region 120 that supports the waist portion of the occupant can be improved in the waist portion supporting member 100. That is, with the vehicle seat frame F1, by more stably supporting the waist portion of the occupant, the shock absorbing property for rear surface collision can be improved.

The bent portion 140 has the bent portion rearward extending region 141 extending toward the lower frame 13. Thereby, in a case where a load is applied to the waist portion supporting region 120 that supports the waist portion of the occupant in the waist portion supporting member 100, the extending region of the bent portion 140 abuts the lower frame 130 and is deformed, so that a shock can be absorbed by the bent portion 140. That is, with the vehicle seat frame F1, by improving a shock absorbing property by the waist portion supporting member 100, the shock absorbing property for rear surface collision can be improved.

The cutout portion 160 is provided around the connection portion 150 between the waist portion supporting region 120 and the bent portion 140. Thereby, at the time of forming the bent portion 140 in the waist portion supporting member 100, deformation of the waist portion supporting region 120 that supports the waist portion of the occupant can be suppressed. The bent portion 140 can also be formed very precisely. That is, with the vehicle seat frame F1, by the waist portion supporting region capable of more stably supporting the waist portion of the occupant and enhancing the rigidity more, the shock absorbing property for rear surface collision can be improved.

The reinforcing regions (reinforcing portions 151) projecting toward the lower frame 13 are provided in the connection portions 150. Thereby, the rigidity of the connection portions 150 connecting the waist portion supporting region 120 and the bent portions 140 can be enhanced. Thereby, in a case where a load is applied to the waist portion supporting region 120, the extending regions of the bent portions 140 can very precisely abut the lower frame 13. Thus, a shock absorbing property of the bent portions 140 can be improved.

The member attachment portions (member attachment holes 145), to which other members are attached, are formed in the bent portion 140. Thereby, a space in the seat outer side direction from the bent portion 140 can be effectively utilized. Thereby, space utilization efficiency inside the seat is improved. Thus, a size increase in the seat can be suppressed.

The above embodiment does not limit the present disclosure but only suggests one example for facilitating understanding of the present disclosure. The present disclosure can be changed and improved without departing from the gist thereof, and the present disclosure includes equivalents thereof as a matter of course.

For example, the example in which the waist portion supporting member 100 according to the present embodiment is applied to the vehicle seat frame including the mechanism where the position adjustment mechanism (front and rear positions, upper and lower positions, and angles of the seatback) of the vehicle seat S is manually adjusted is described in the above embodiment. However, the above waist portion supporting member 100 can similarly be applied to a vehicle seat frame in which a position adjustment mechanism of a vehicle seat S is adjusted by using an electric actuator.

Figure 12:
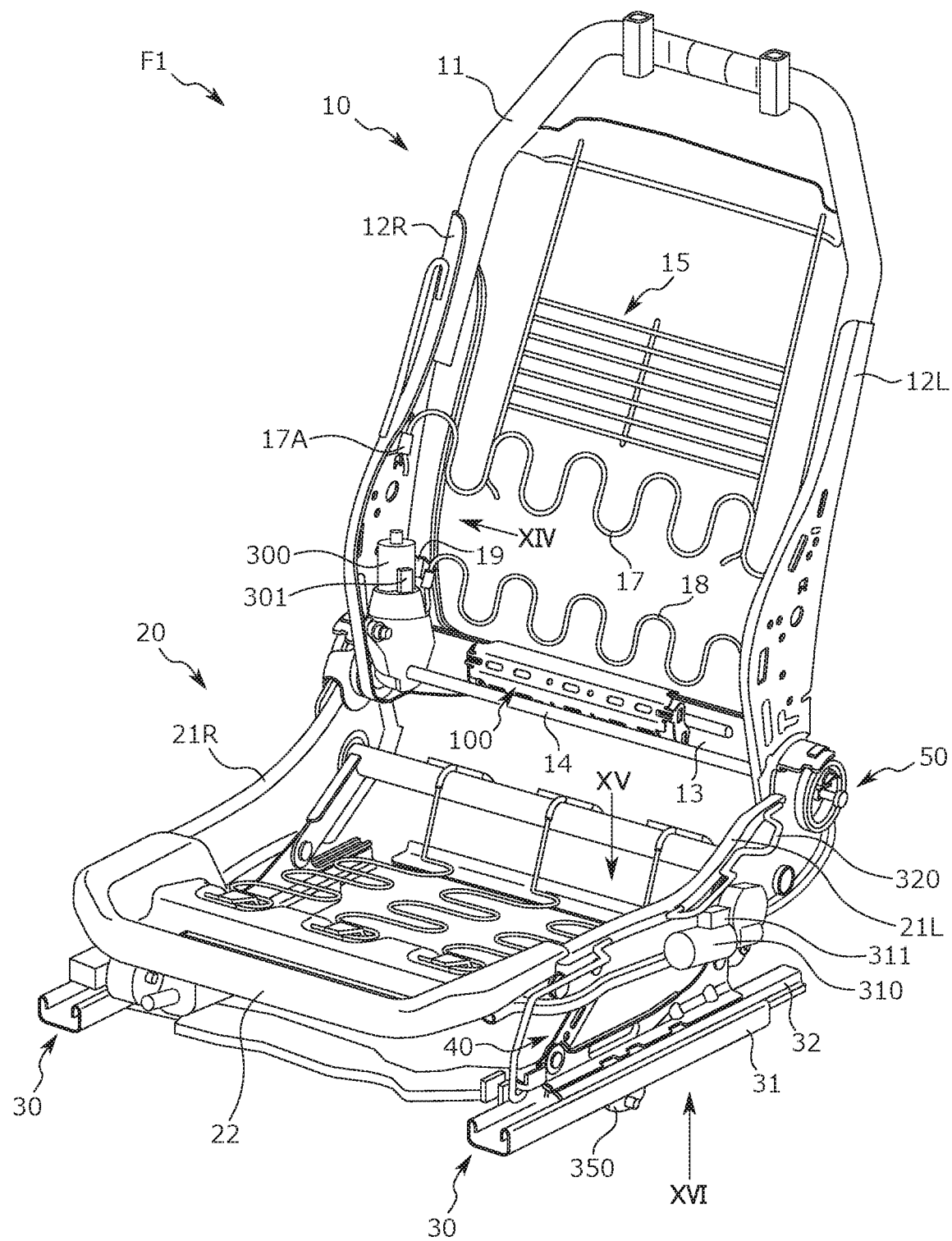
FIG. 12 is a perspective view of a vehicle seat frame according to a second embodiment.
Figure 13:
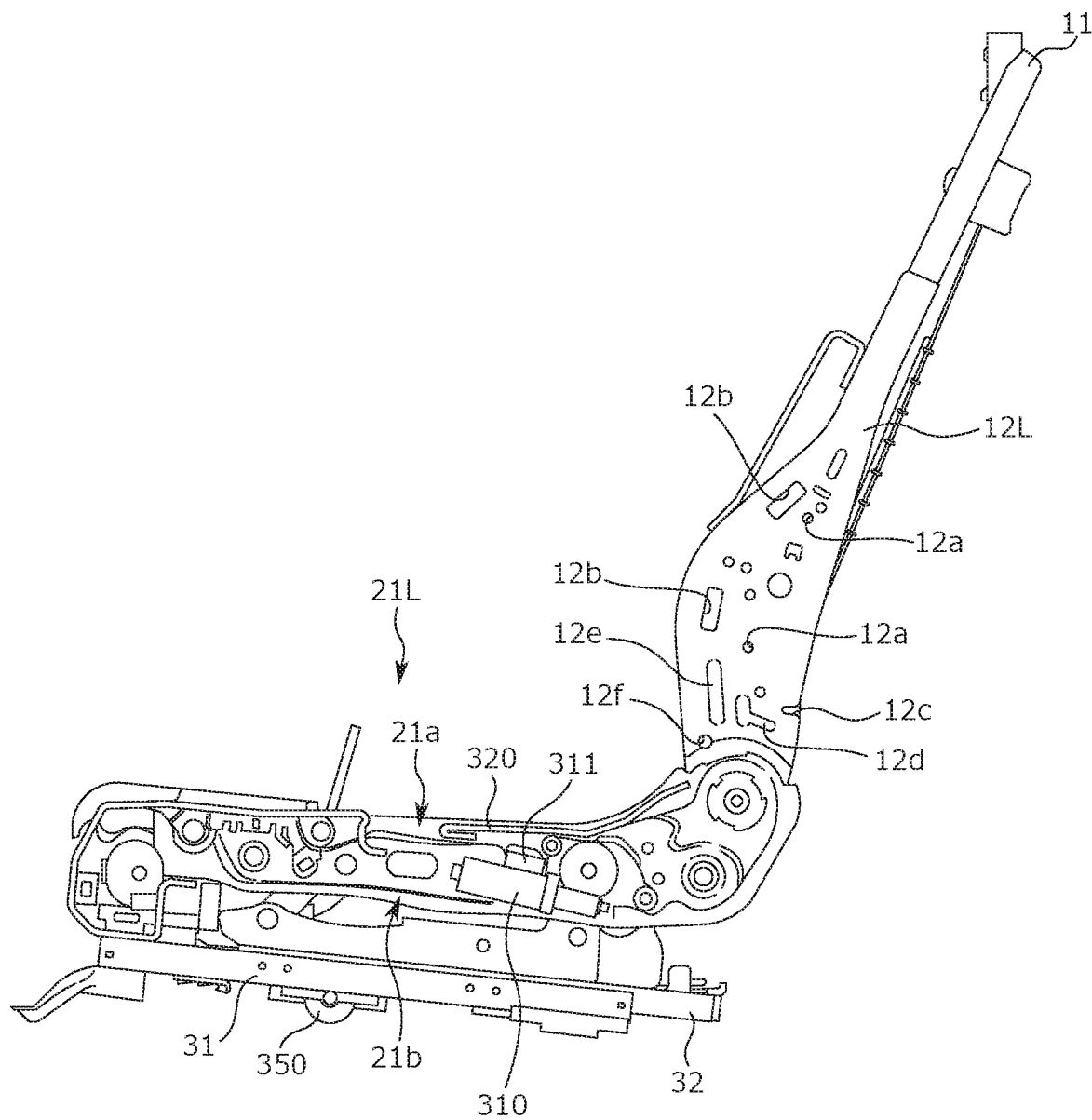
FIG. 13 is a side view of the vehicle seat frame according to the second embodiment.
Figure 14:
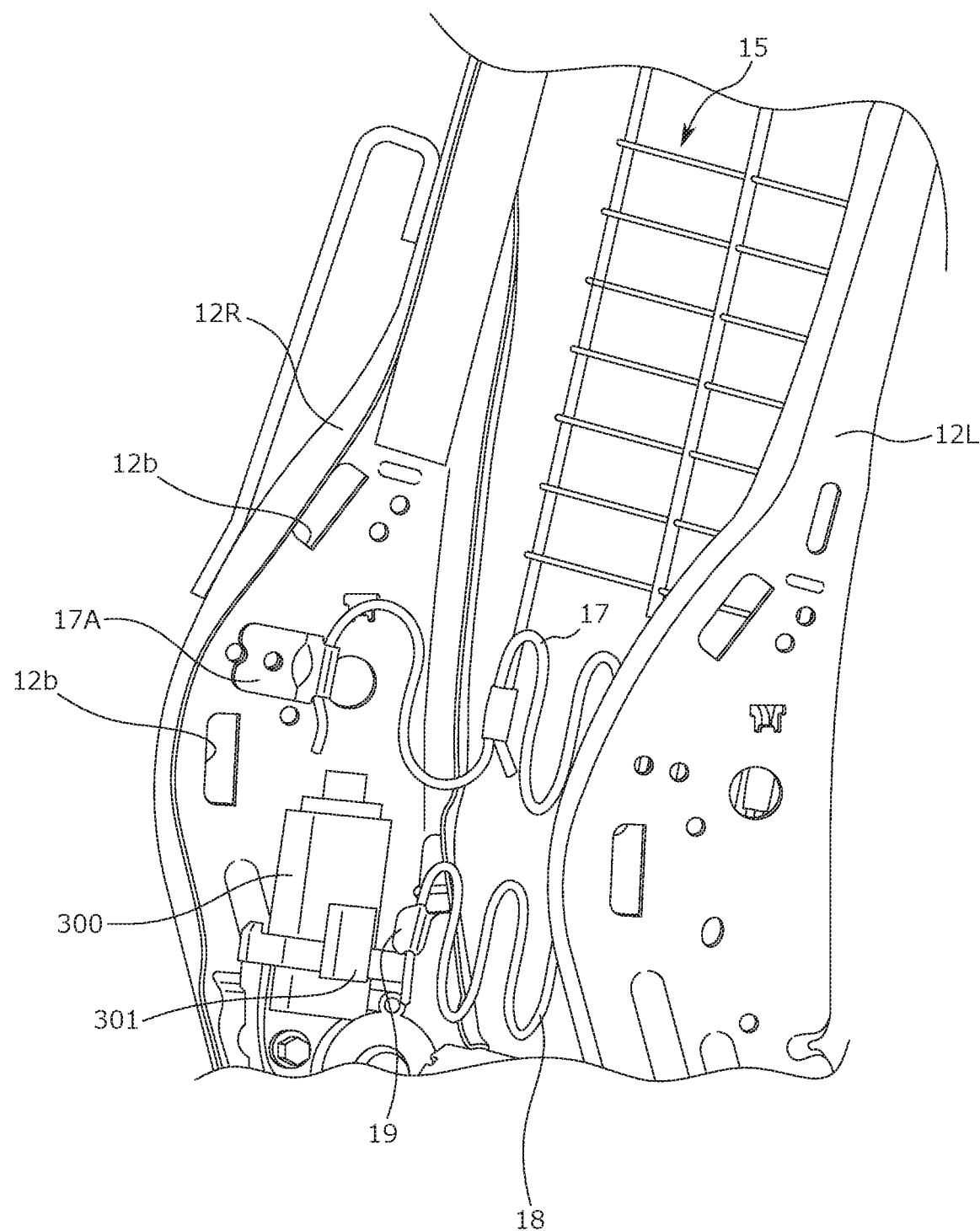
FIG. 14 is a partially enlarged view of attachment points of S springs in the vehicle seat frame according to the second embodiment.
Figure 15:
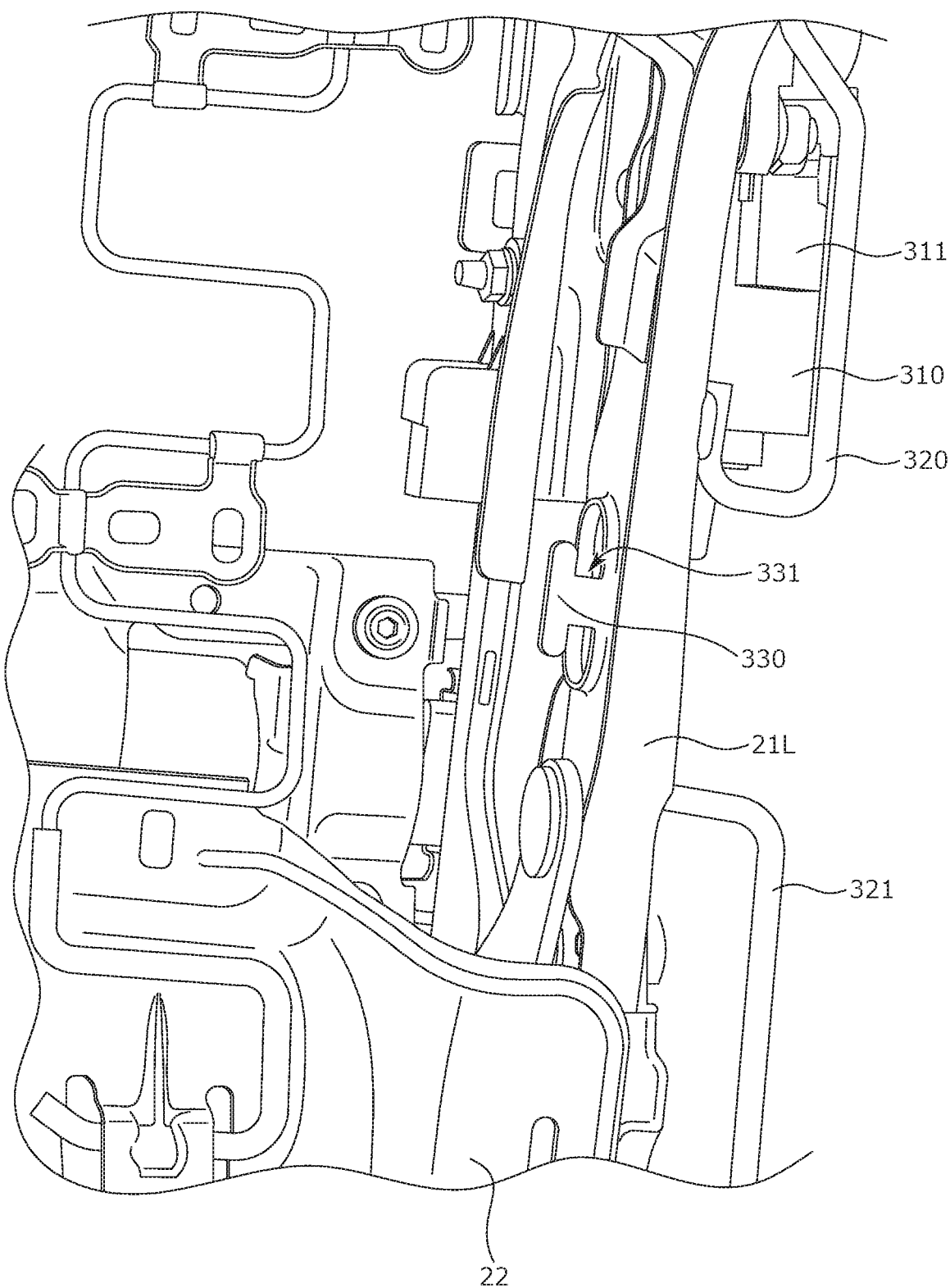
FIG. 15 is a partially enlarged view of the inside of a cushion side frame in the vehicle seat frame according to the second embodiment.
Figure 16:
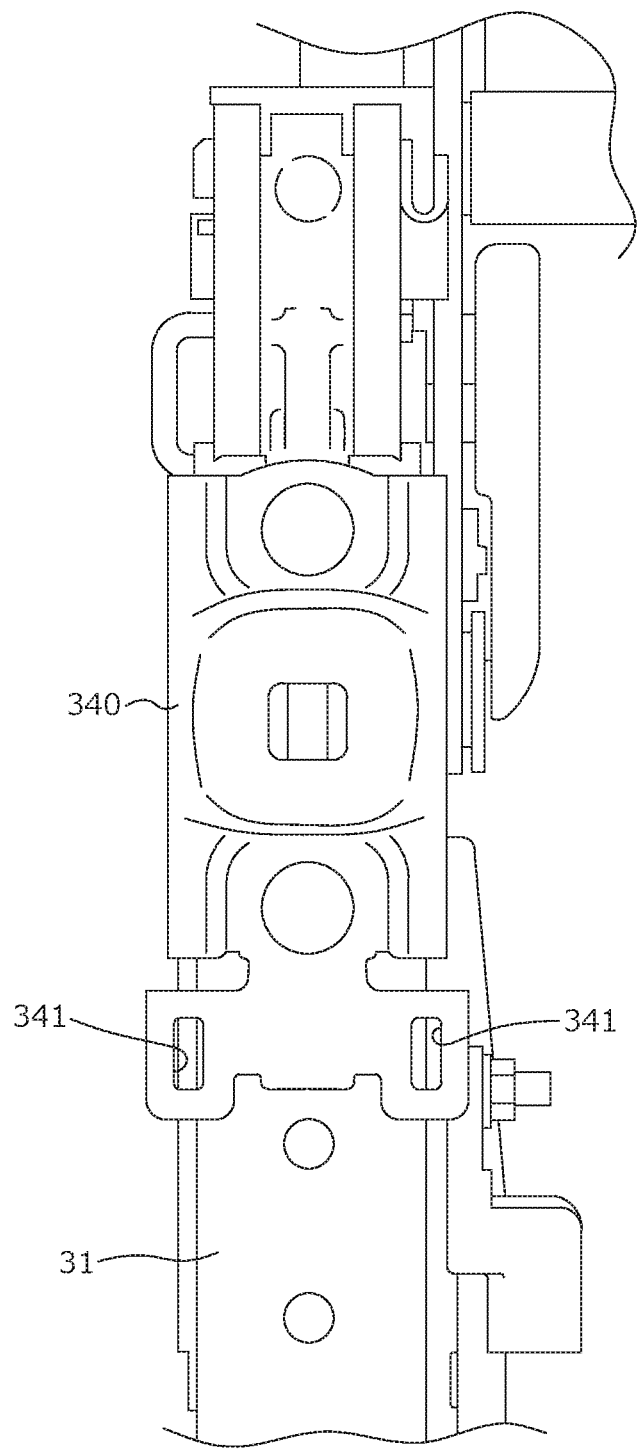
FIG. 16 is a partially enlarged view of a rail back surface in the vehicle seat frame according to the second embodiment.

FIG. 12 is a perspective view of a vehicle seat frame F2 serving as a framework of the vehicle seat S whose position adjustment mechanism is electrically adjusted, and FIG. 13 is a side view of the vehicle seat frame F2. FIG. 14 is a directional view seen from the XIV direction of FIG. 12, the partially enlarged view of attachment points of S springs 17, 18 in the vehicle seat frame F2. FIG. 15 is a directional view seen from the XV direction of FIG. 12, the partially enlarged view of the inside of a cushion side frame 21L in the vehicle seat frame F2. FIG. 16 is a directional view seen from the XVI direction of FIG. 12, the partially enlarged view of a back surface of a lower rail 31 in the vehicle seat frame F2.

As shown in FIGS. 12 and 13, a configuration of a seatback frame 10 of the vehicle seat frame F2 is generally the same as that of the vehicle seat frame F1. Thus, different points are described below.

As shown in FIGS. 12 and 14, in the vehicle seat frame F2, an actuator 300 that generates a drive force for adjusting an angle of a reclining mechanism 50 is attached to a portion around a bonded part between a lower frame 13 and a seatback side frame 12R. The actuator 300 includes a connector 301 to which a cable is connected. Drive power, control signals, etc. are inputted to the actuator 300 via the cable and the connector 301.

The connector 301 is arranged at a position overlapping with an S spring hook bracket 19 provided in the side of the seatback side frame 12R in the seat front-to-back direction. By arranging the connector 301 and the S spring hook bracket 19 in such a way, an inner space of the vehicle seat frame F2 can be effectively utilized, and at the time of receiving a shock from the rear side, the connector 301 can be protected.

As shown in FIG. 14, a locking portion 17A that locks the S spring 17 is provided between upper and lower stay cloth clip attachment holes 12b of the seatback side frame 12R. By arranging the locking portion 17A between the stay cloth clip attachment holes 12b in such a way, a part onto which force is applied at the time of deploying the airbag can be reinforced. A locking portion 17A is also provided between stay cloth clip attachment holes 12b in a seatback side frame 12L.

As shown in FIG. 13, on a side surface of the cushion side frame 21L on the seat outer side, bead portions 21a, 21b extending from a center portion to a front side portion are provided respectively in an upper side end portion and a lower side end portion. An actuator 310 that activates a movable portion of a height adjustment mechanism 40 is attached between the upper and lower bead portions 21a, 21b. By effectively utilizing a space between the upper and lower bead portions 21a, 21b in such a way, the vehicle seat S can be compactly formed.

The actuator 310 that activates the height adjustment mechanism 40 includes a connector 311 to which a cable is connected. Drive power, control signals, etc. are inputted to the actuator 310 via the cable and the connector 311. As shown in FIGS. 12, 13, and 15, the connector 311 is arranged on the lower side of a wire 320 for fixing a cover of the vehicle seat S. By arranging the connector 311 on the lower side of the wire 320 in such a way, at the time of receiving a shock from the upper side, the connector 311 can be protected.

As shown in FIG. 13, an actuator 350 that activates a slide rail mechanism 30 is attached on the lower side of the lower rail 31.

As shown in FIG. 15, a cut and upward-bent portion 330, cut and bent upward to the seat upper side from a hole portion 331, is provided between respective attachment parts of the wire 310 and a wire 321 of the cushion side frame 21L on a side surface of the cushion side frame 21L on the seat inner side. By fixing a harness to a part of this cut and upward-bent portion 330 extending in the seat width direction with a binding tool (binding band), movement in the seat width direction of the harness can be suppressed.

As shown in FIG. 16, a rail bottom bracket 340, in which engagement holes 341 that engage claws of a foot cover of the vehicle seat S are formed, is attached on a bottom surface of the lower rail 31 on the seat rear side. By providing such a rail bottom bracket 340, the foot cover can be stable fixed to the vehicle seat frame F2.

The above cut and upward-bent portion 330 and the rail bottom bracket 340 may also be provided in the vehicle seat frame F1 as a matter of course.

Vehicle Seat Frame F1a Including Side Airbag Mechanism SA

Next, a vehicle seat frame F1a according to a modified example of the vehicle seat frame F1 is described based on FIGS. 17 to 31. The vehicle seat frame F1a described below is different from the vehicle seat frame F1 in a point that a side airbag mechanism SA is attached to the seatback side frame 12L of the vehicle seat frame F1 according to the first embodiment. However, the other points are common between the vehicle seat frames. Hereinafter, points that are different from the vehicle seat frame F1 are described. First of all, outlines of the figures is briefly described.

Figure 17:
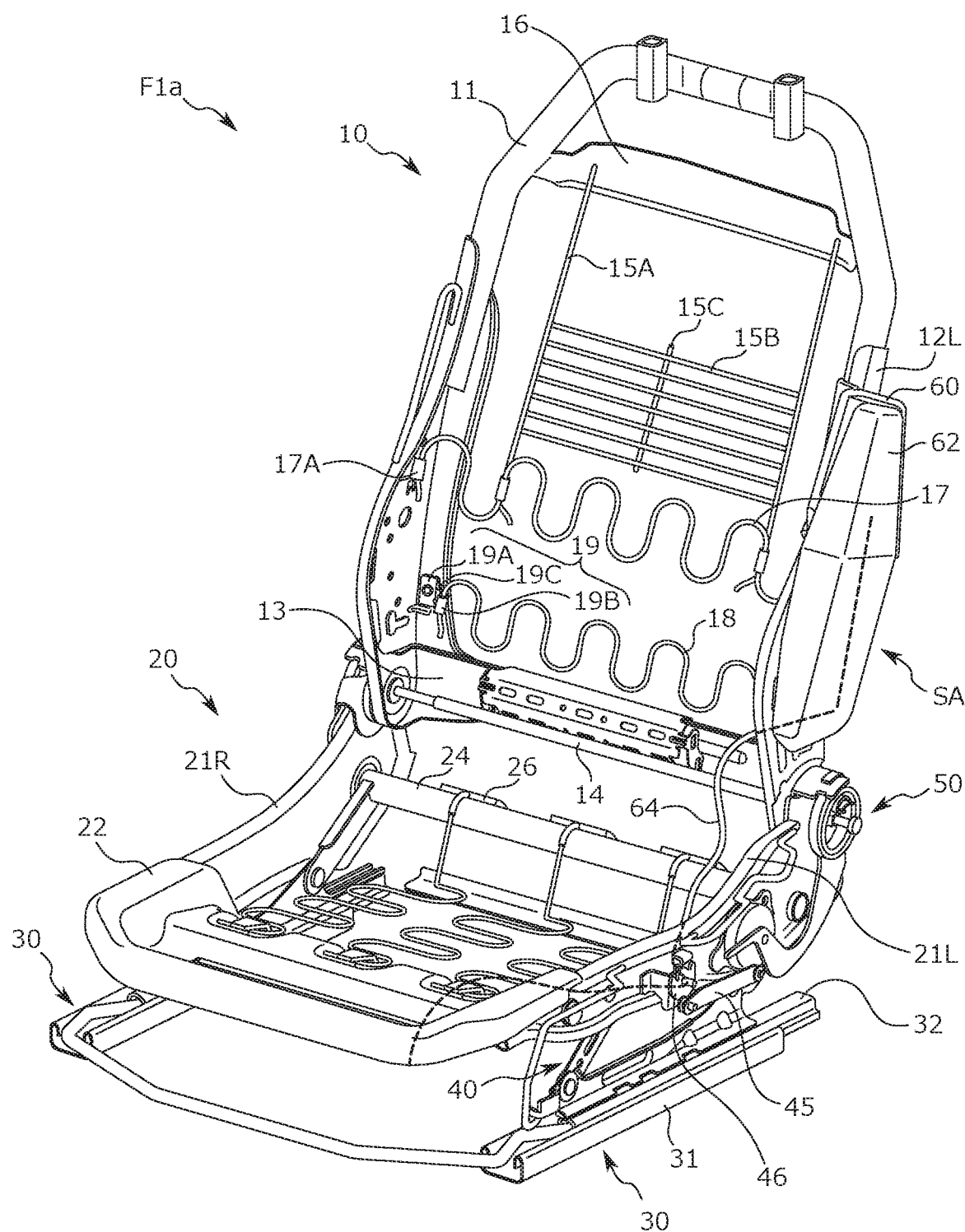
FIG. 17 is a perspective view of a vehicle seat frame according to a modified example of the first embodiment.
Figure 18:
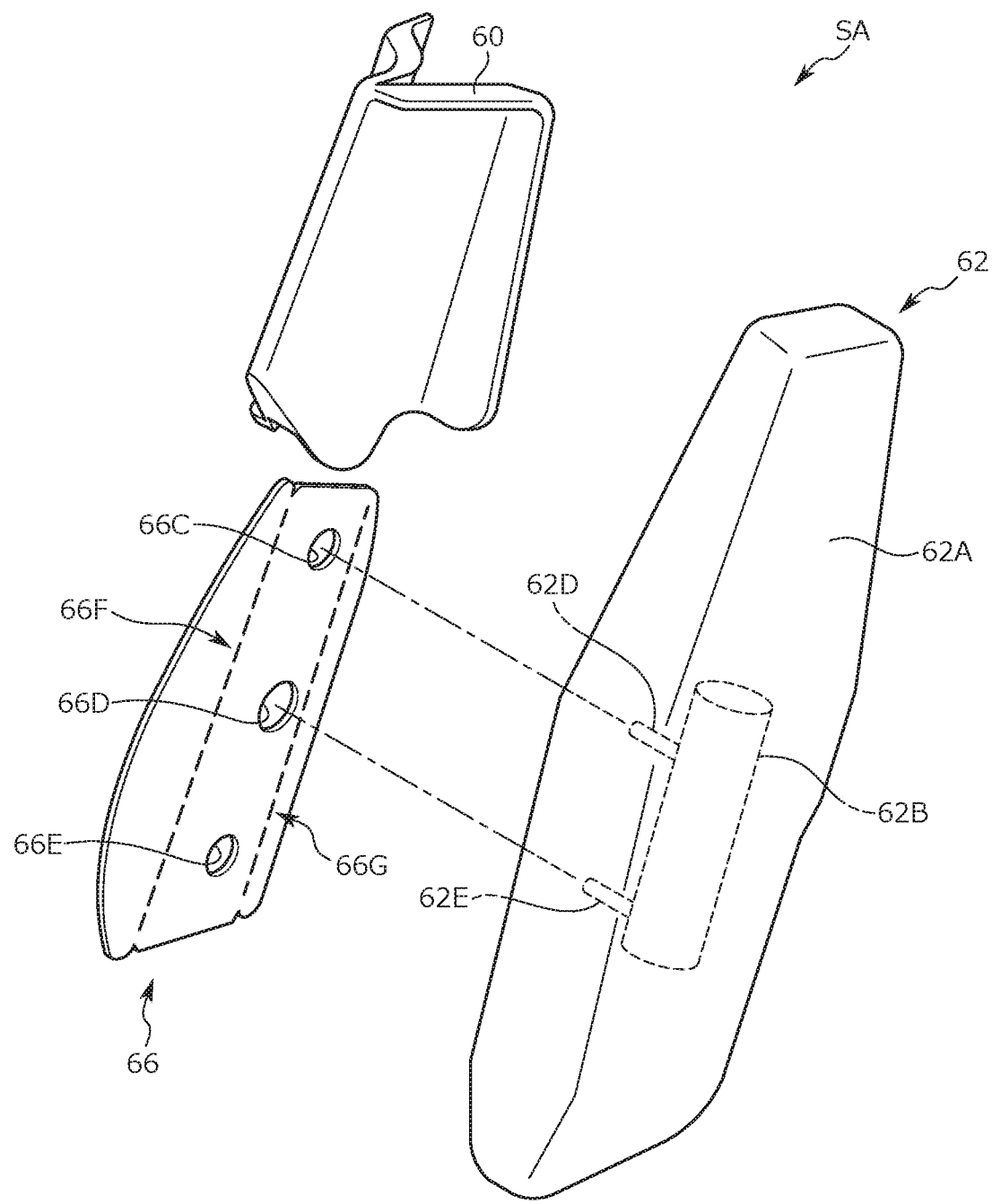
FIG. 18 is an exploded perspective view of a side airbag mechanism.

FIG. 17 is a perspective view of the vehicle seat frame F1a, and FIG. 18 is an exploded perspective view of the side airbag mechanism SA attached to the vehicle seat frame F1a. Although details are described below, as shown in FIG. 18, the side airbag mechanism SA includes a support member 60, an airbag module 62, and a stay cloth attachment plate 66.

Figure 19:
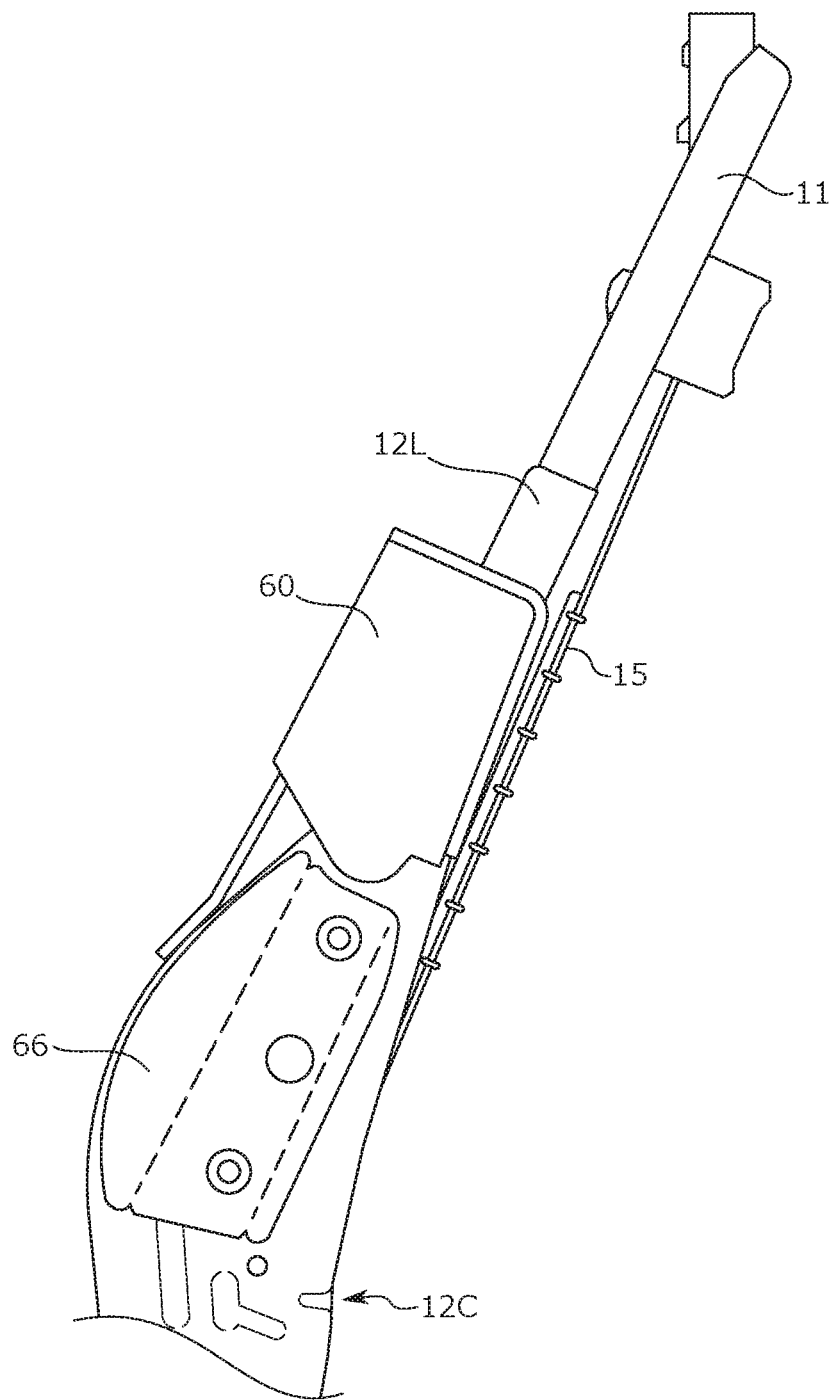
FIG. 19 is a side view showing a state where a support member and a stay cloth attachment plate are attached to a seatback side frame.
Figure 20:
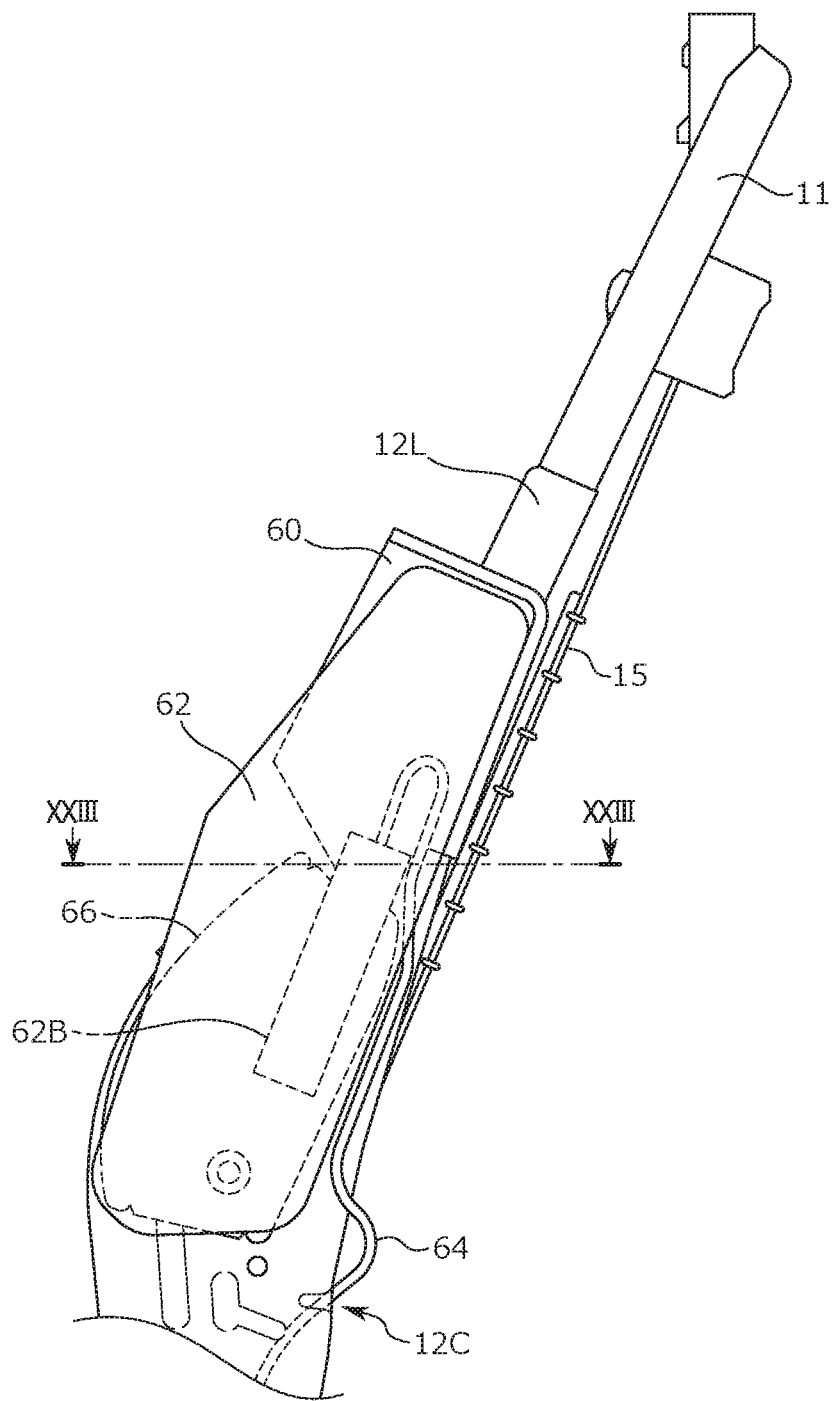
FIG. 20 is a side view showing a state where an airbag module is further attached in FIG. 19.

FIG. 19 is a side view showing a state where the support member 60 and the stay cloth attachment plate 66 are attached to a seatback side frame 12L, and FIG. 20 is a side view showing a state where the airbag module 62 is further attached in FIG. 19.

Figure 21:
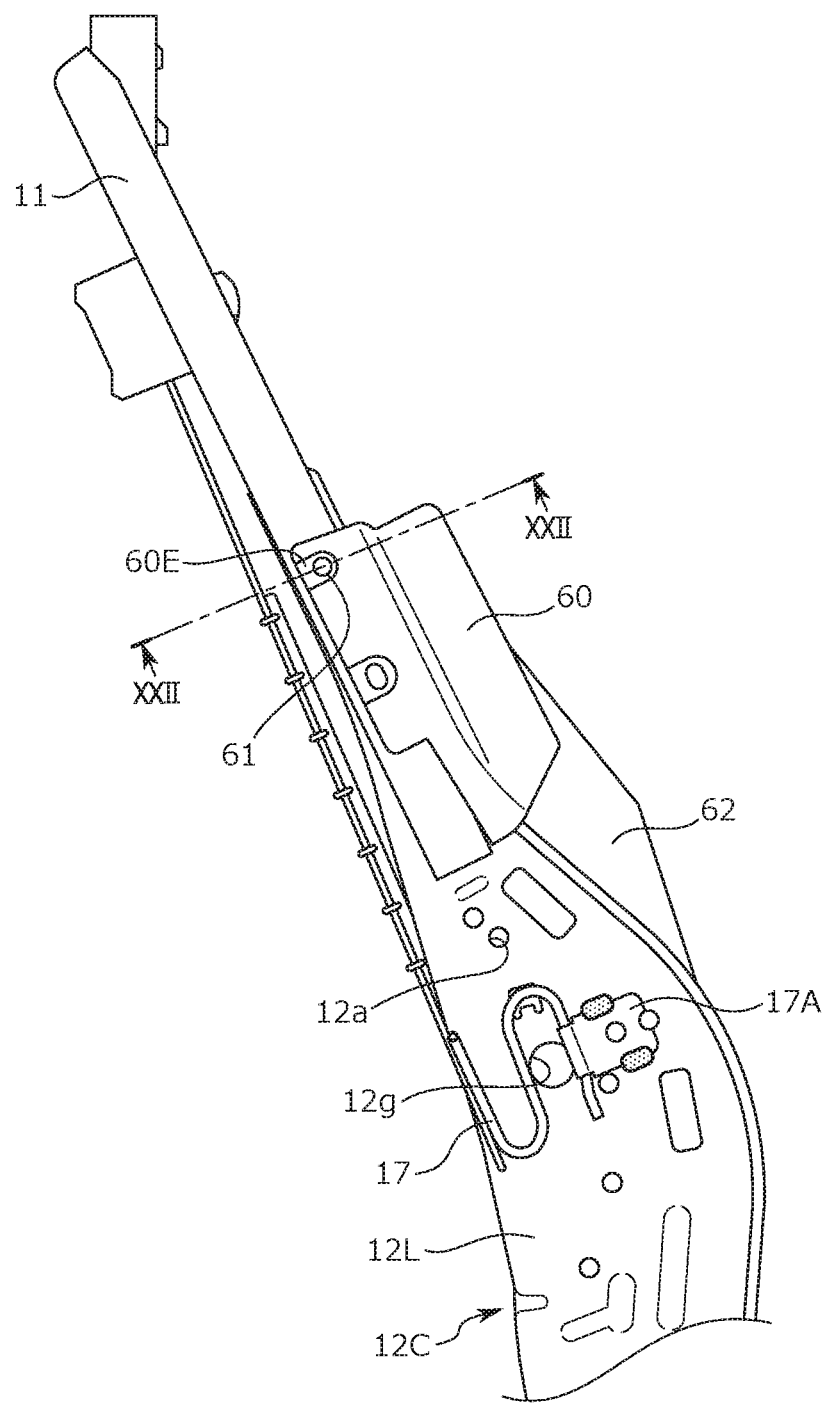
FIG. 21 is a side view from the seat inner side of the seatback side frame to which the side airbag mechanism is attached.
Figure 22:
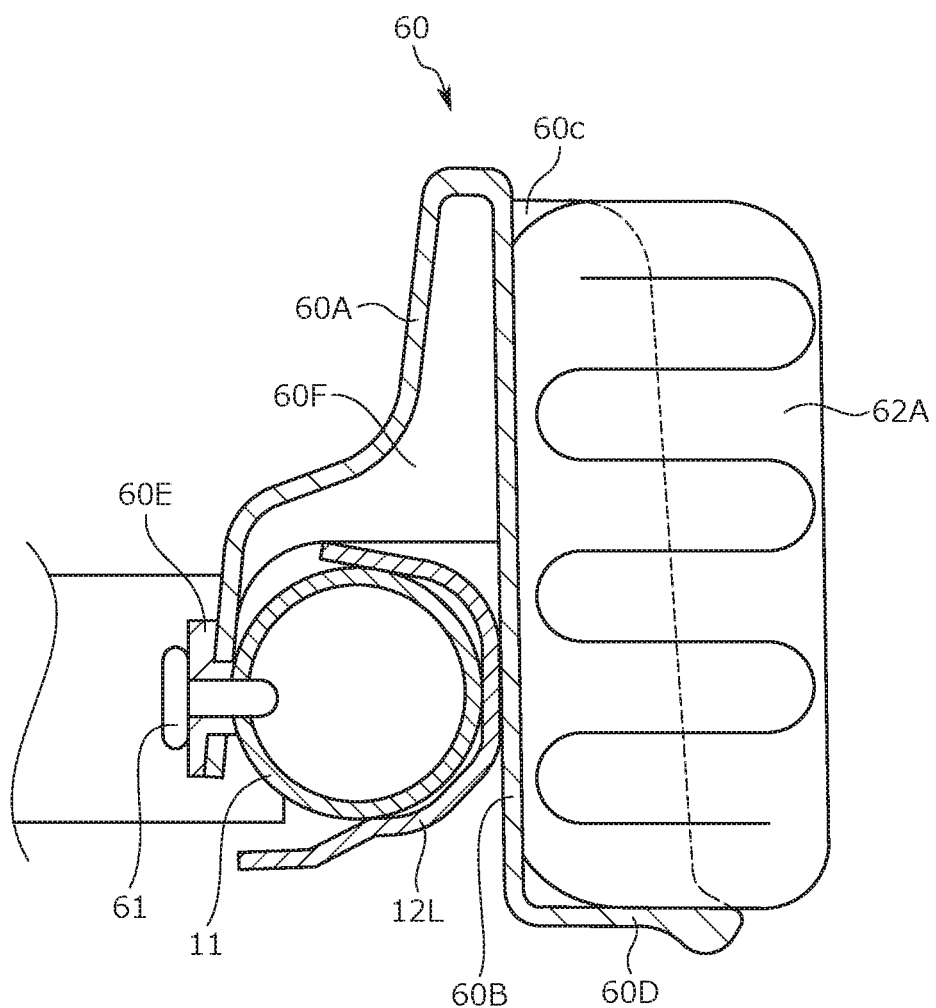
FIG. 22 is a cross-sectional view taken along the line XXII-XXII of FIG. 21.
Figure 23:
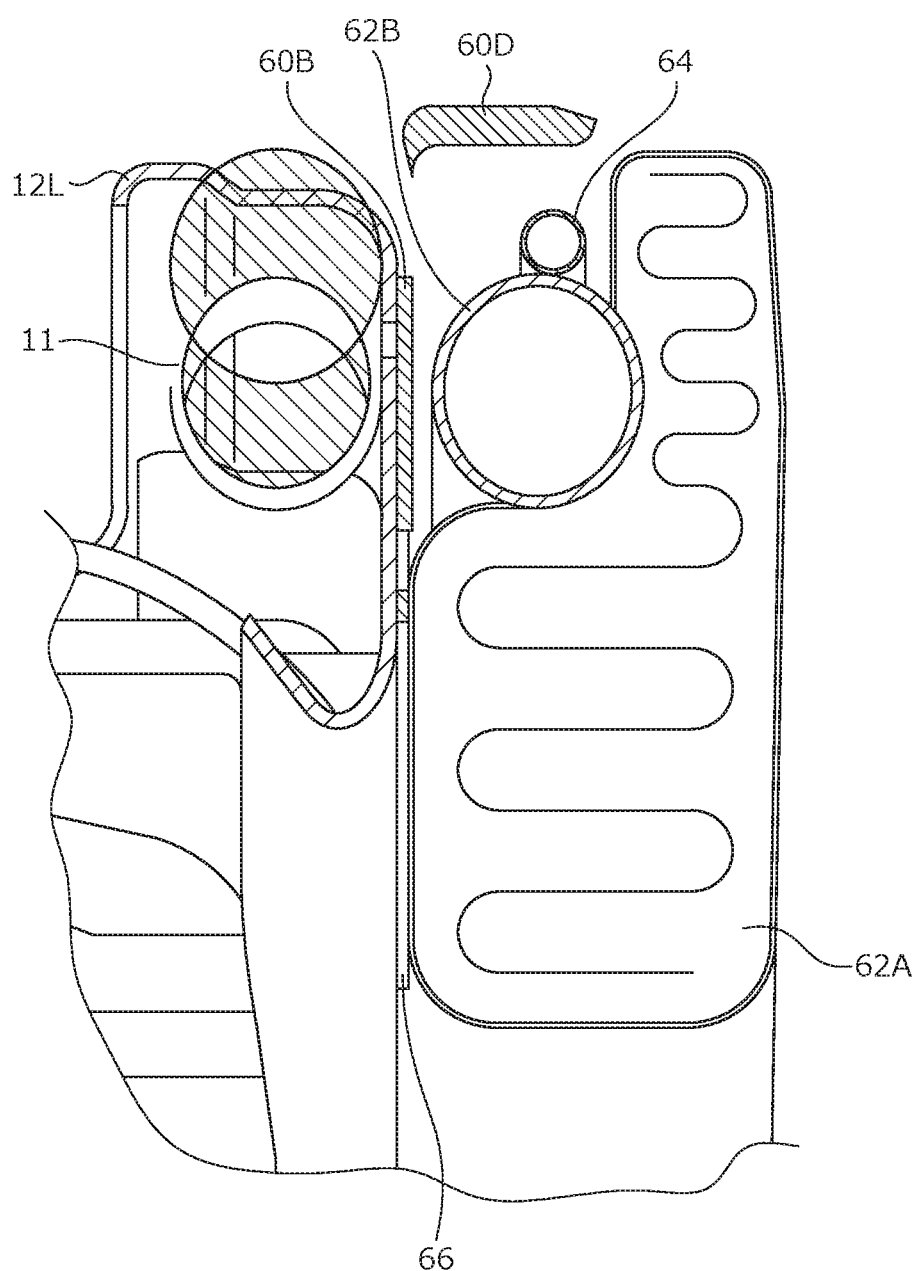
FIG. 23 is cross-sectional view taken along the line XXIII-XXIII of FIG. 20.

FIG. 21 is a side view from the seat inner side of the seatback side frame 12L to which the side airbag mechanism SA is attached. FIG. 22 is a cross-sectional view taken along the line XXII-XXII of FIG. 21, and FIG. 23 is cross-sectional view taken along the line XXIII-XXIII of FIG. 20.

Figure 24:
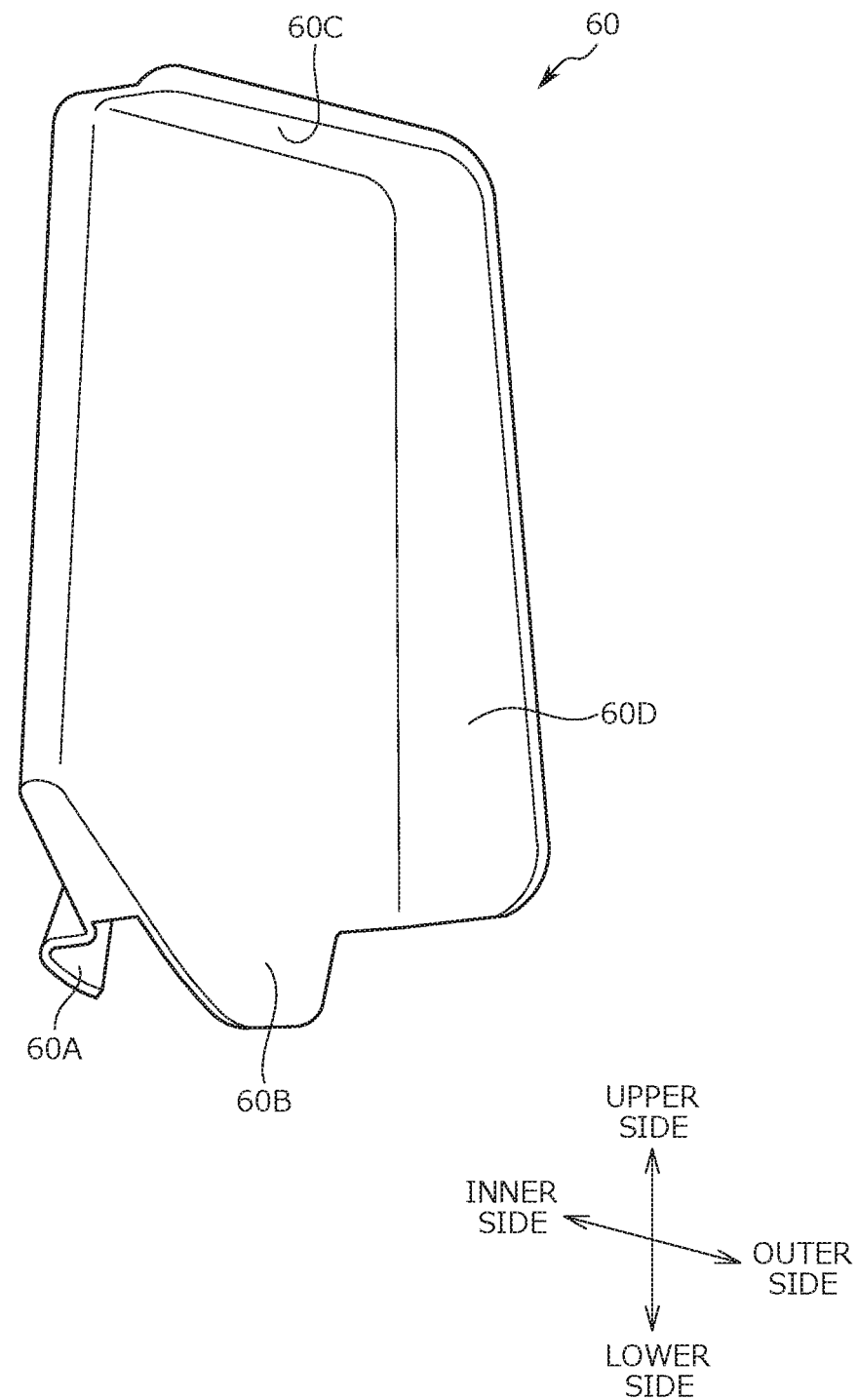
FIG. 24 is a perspective view from the right side of a front surface of the support member.
Figure 25:
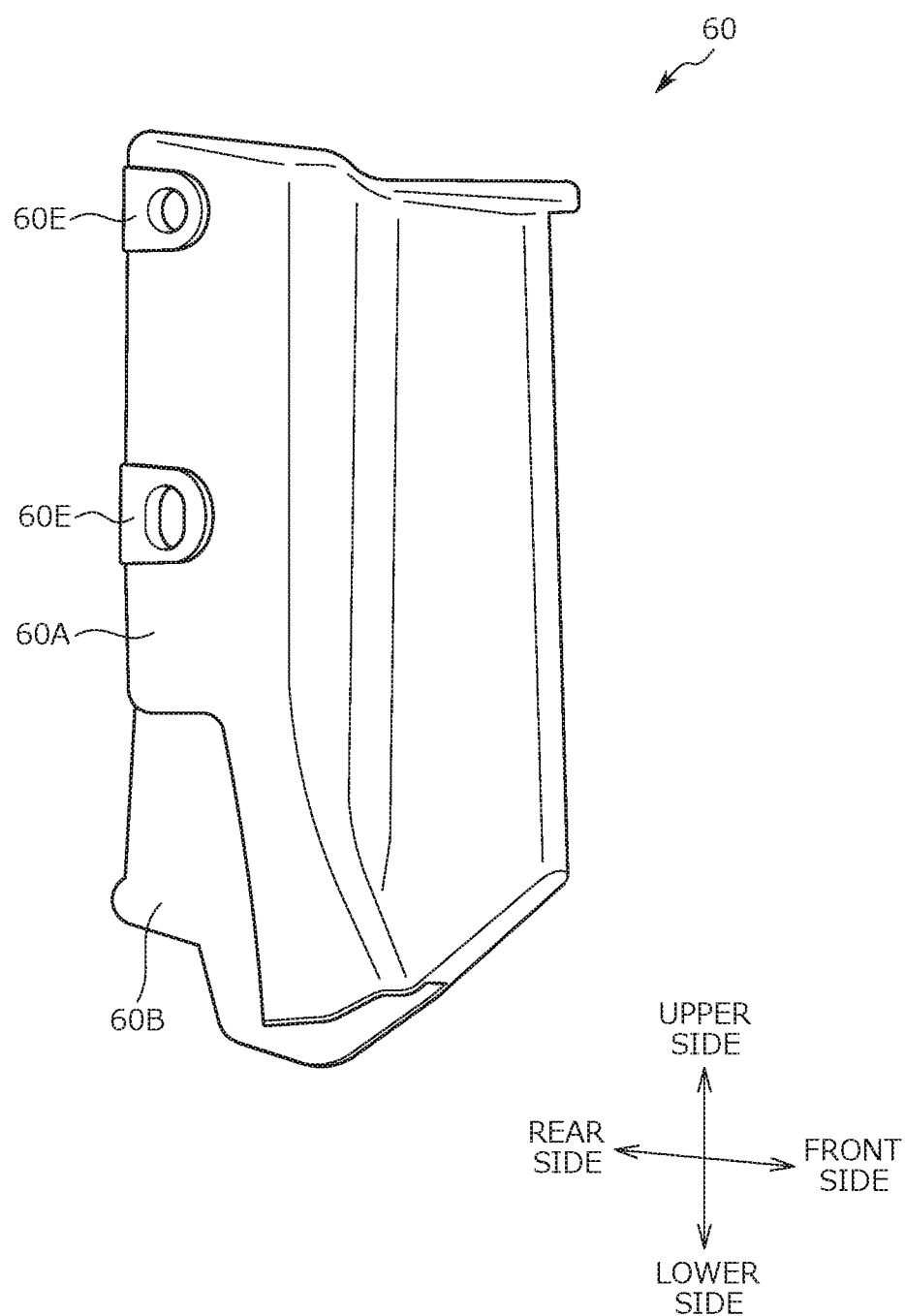
FIG. 25 is a perspective view from the left side of the front surface of the support member.
Figure 26:
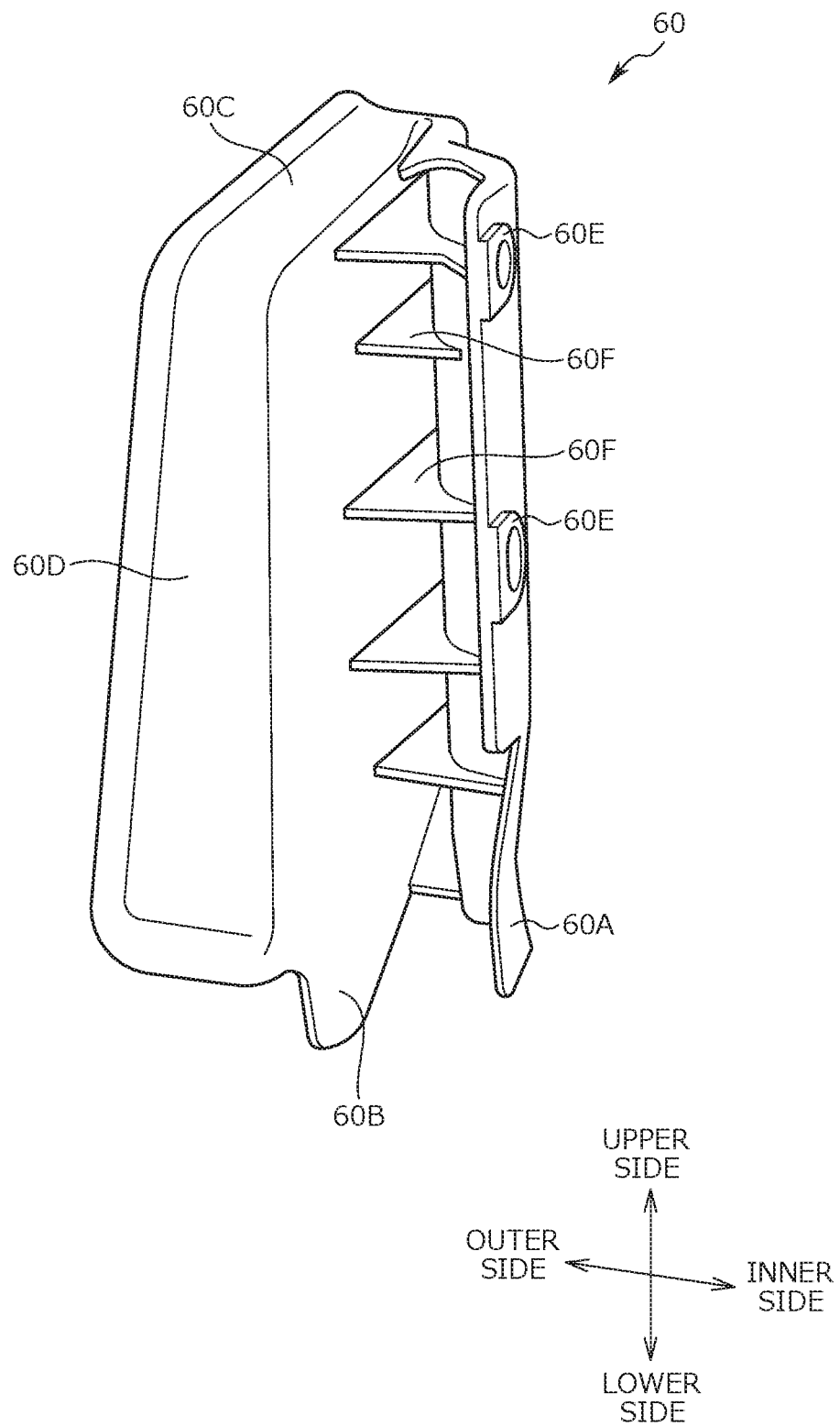
FIG. 26 is a perspective view from a rear surface of the support member.
Figure 27:
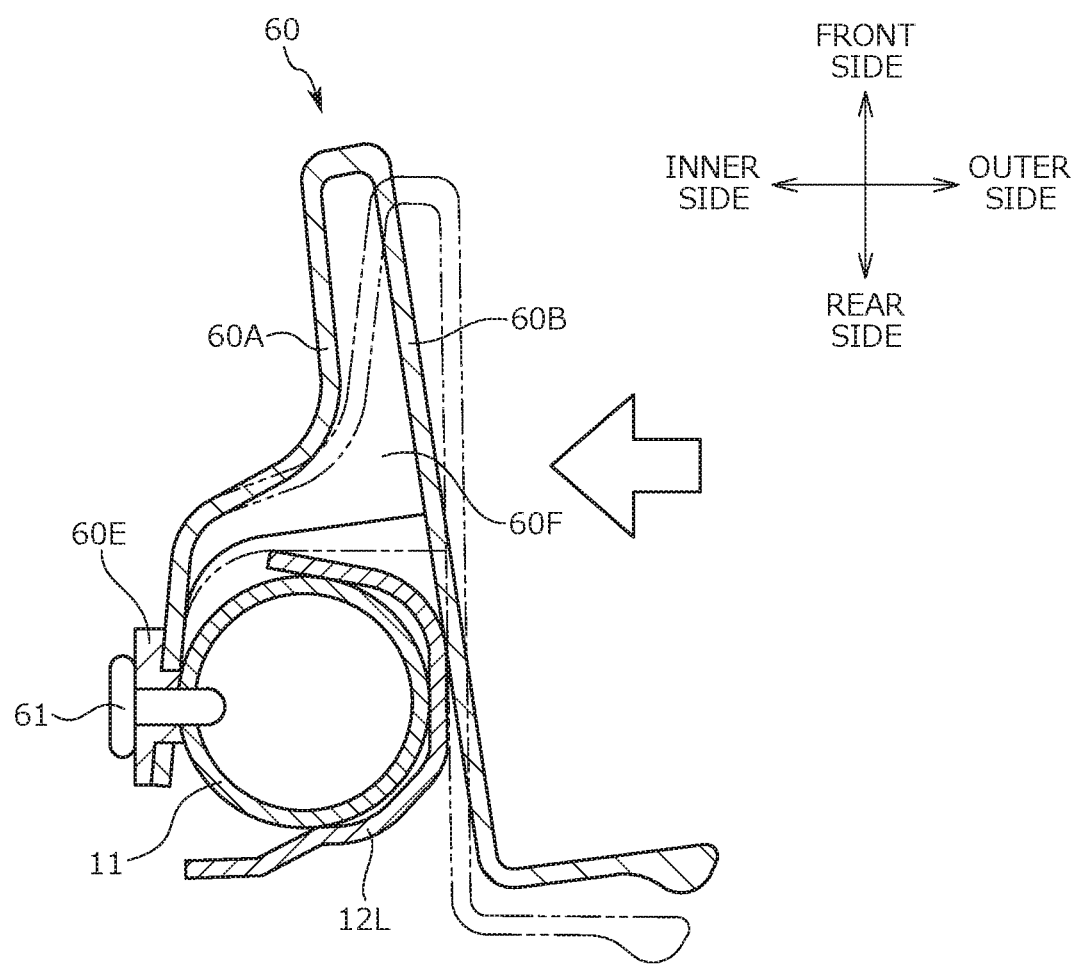
FIG. 27 is a cross-sectional view for illustrating a state of the support member when a load is received from the seat outer side.

FIG. 24 is a perspective view of the side of an outer plate of the support member 60, FIG. 25 is a perspective view of the side of an inner plate of the support member 60, and FIG. 26 is a perspective view of the rear side of the support member 60. FIG. 27 is a view for illustrating a state of the support member when a shock is received from the seat outer side.

Figure 28:
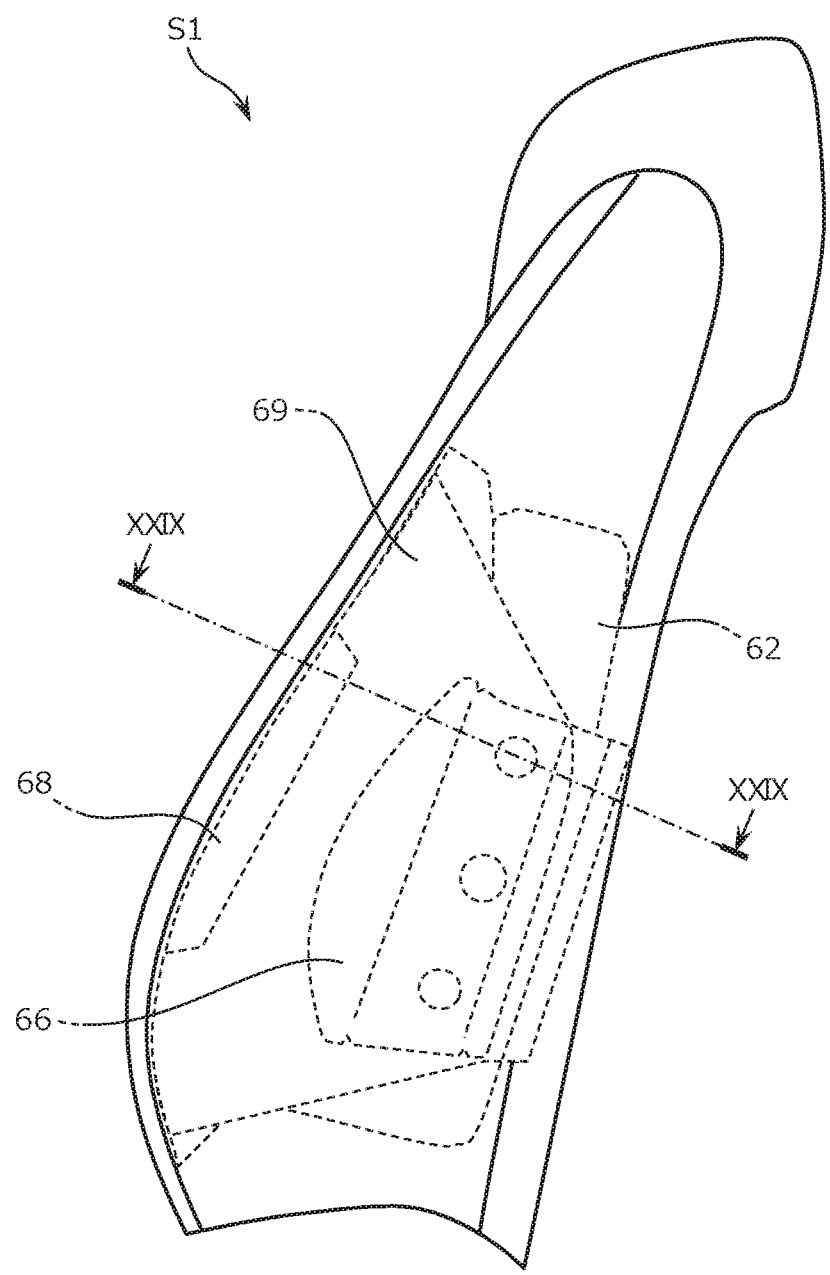
FIG. 28 is a side view of the vehicle seat.
Figure 29:
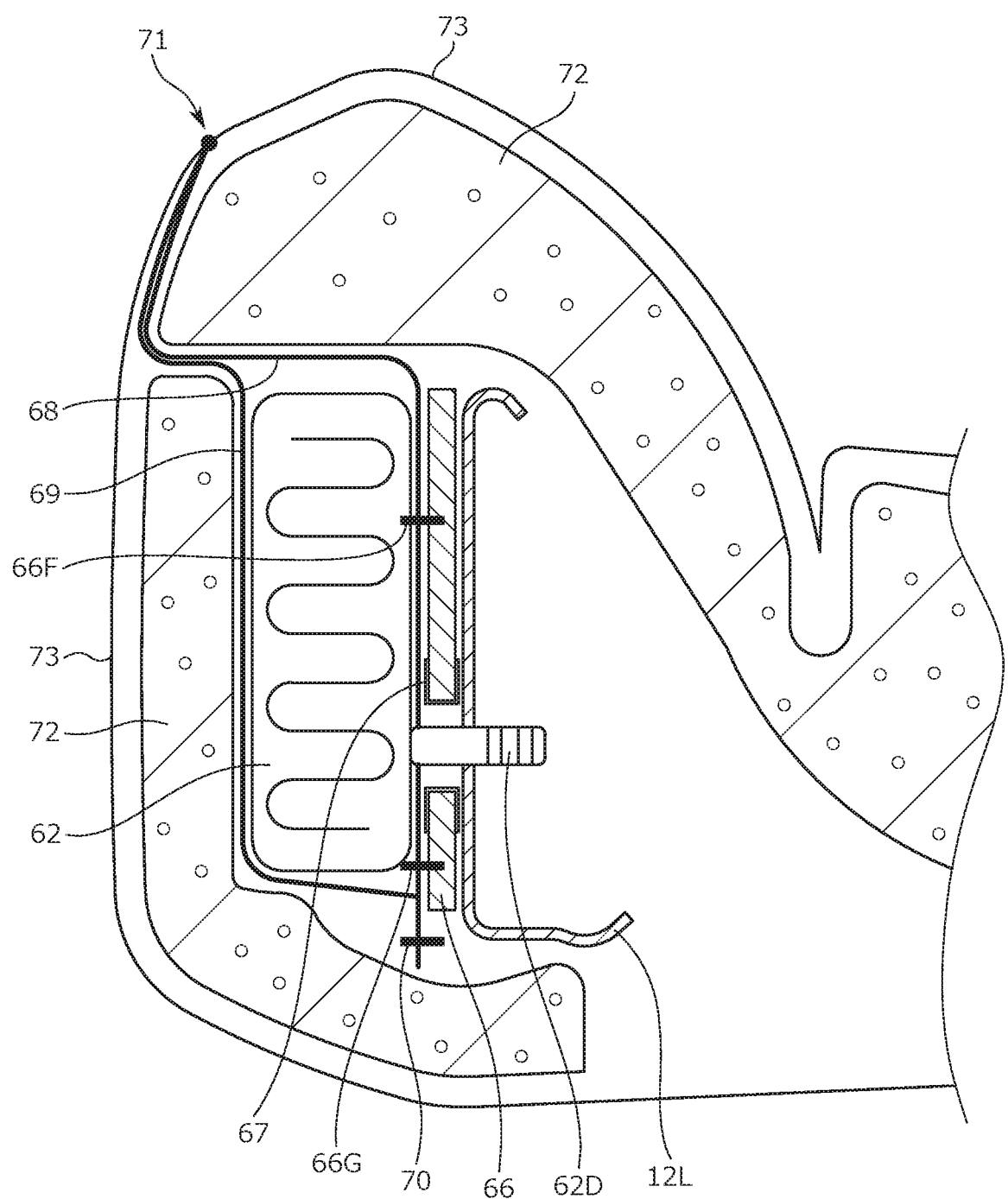
FIG. 29 is a cross-sectional view taken along the line XXIX-XXIX of FIG. 28.
Figure 30:
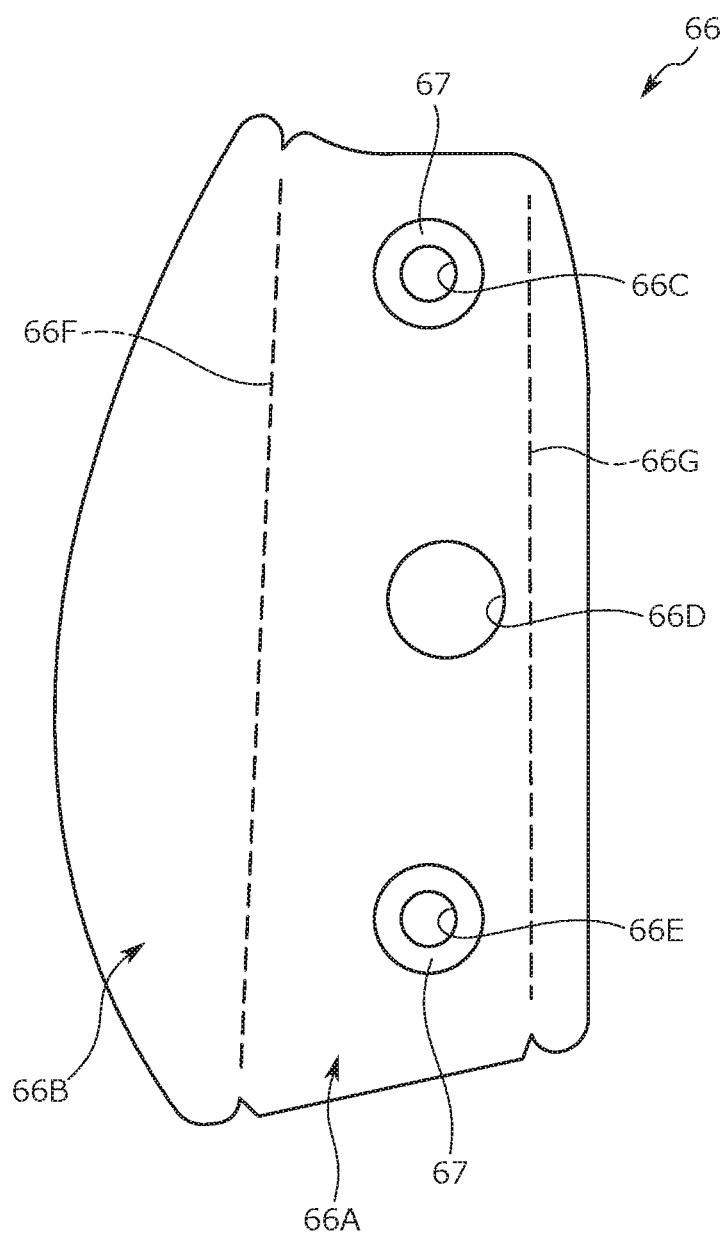
FIG. 30 is a front view of the stay cloth attachment plate.
Figure 31:
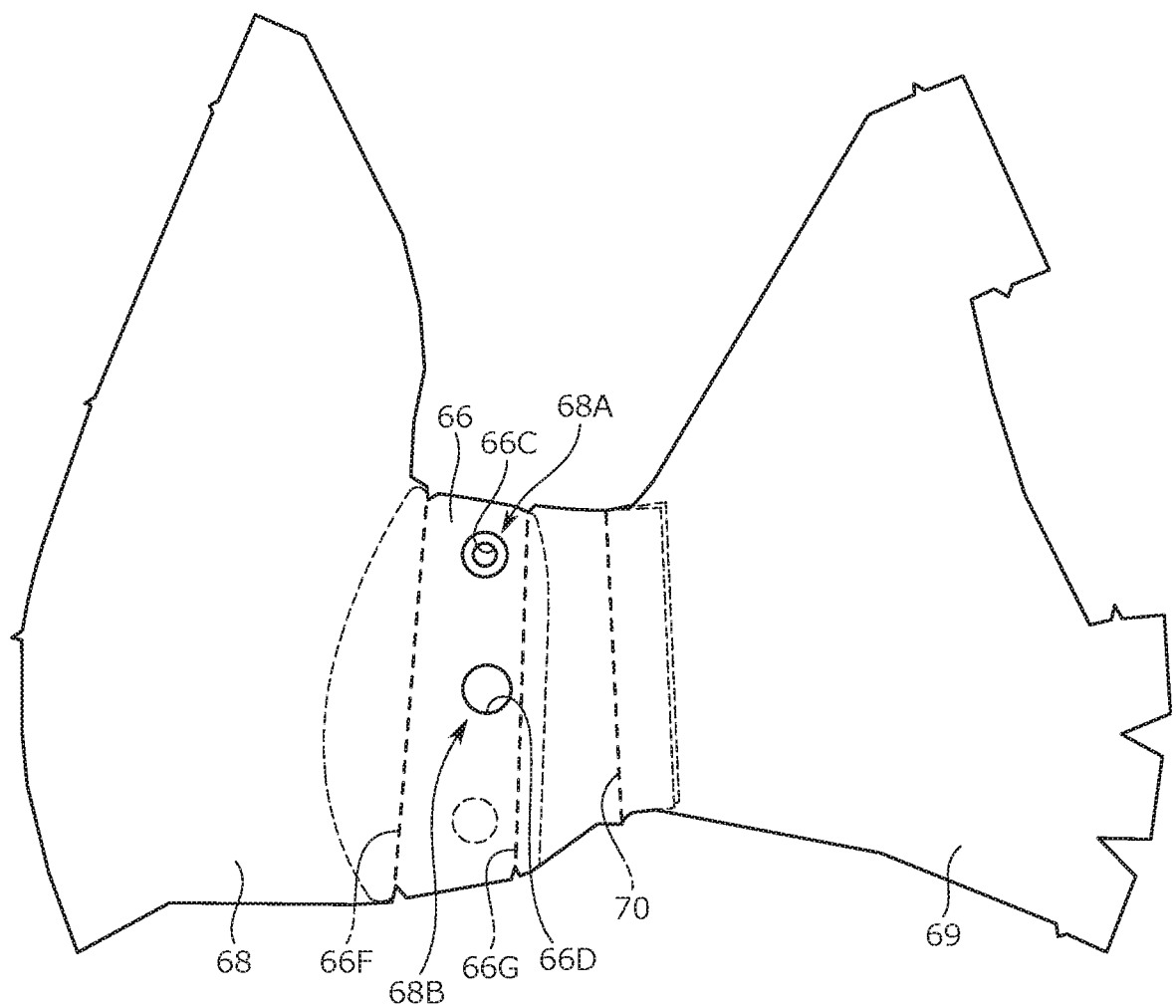
FIG. 31 is a view showing a state where an inner stay cloth and an outer stay cloth are attached to the stay cloth attachment plate.

FIG. 28 is a left side view of a seatback S1, and FIG. 29 is a cross-sectional view taken along the line XXIX-XXIX of FIG. 28. FIG. 30 is a front view of the stay cloth attachment plate 66, and FIG. 31 shows a state where stay cloths are attached to the stay cloth attachment plate 66.

As described above, the side airbag mechanism SA includes the support member 60, the airbag module 62, and the stay cloth attachment plate 66. As shown in FIG. 19, the support member 60 and the stay cloth attachment plate 66 are attached side by side in the up and down direction to abut a surface of the seatback side frame 12L on the seat outer side. As shown in FIG. 20, the airbag module 62 is arranged on the seat outer side of the support member 60 and the stay cloth attachment plate 66, and the airbag module 62 is attached to the seatback side frame 12L via the support member 60 and the stay cloth attachment plate 66.

The support member 60 is provided for supporting the occupant in the seat width direction from external force applied to the vehicle. For example, the support member is made of elastomer resin such as thermo polyolefin (TPO) and thermoplastic polyurethane (TPU). The support member 60 is attached to at least one of the right seatback side frame 12R and the left seatback side frame 12L, in the present embodiment, to the left seatback side frame 12L.

The airbag module 62 is a device that absorbs a shock at the time of collision of the vehicle and protects the occupant. In the present embodiment, the airbag module 62 is a caseless airbag module having no module case. However, the present disclosure is not limited to this but the airbag module may have a module case.

The airbag module 62 includes an airbag 62A and an inflator 62B. The airbag 62A and the inflator 62B are wrapped and held together by a wrapping material. The inflator 62B is a device that generates a gas in accordance with an input signal from a harness 64, and by inputting the gas generated by the inflator 62B into the airbag 62A, the airbag 62A is opened and deployed.

Side surfaces of the airbag 62A are covered by the stay cloths attached to the stay cloth attachment plate 66 and the developing direction is guided by the stay cloths.

Details of a configuration of the support member 60 are now described. As shown in FIGS. 24 to 26, the support member 60 includes an inner plate 60A fixed to the seatback side frame 12L on the inner side in the seat width direction, an outer plate 60B fixed to the seatback side frame 12L on the outer side in the seat width direction, and plural ribs 60F coupling front portions of the inner side plate 60A and the outer side plate 60B.

Front side end portions of the inner side plate 60A and the outer side plate 60B are coupled to each other. The inner side plate 60A and the outer side plate 60B are provided in such a manner that a gap between both the plates increases from the front side end portions to the rear side.

As shown in FIG. 24, the outer plate 60B is formed in a substantially flat plate shape, and a length of the outer plate in the up and down direction is substantially the same as that of the inner plate 60A.

A first flange portion 60C and a second flange portion 60D are respectively provided in an upper side end portion and a rear side end portion of the outer plate 60B. The first flange portion 60C extends from the upper side end portion of the outer plate 60B to the seat outer side, and the second flange portion 60D extends from the rear side end portion of the outer plate 60B to the seat outer side. The first flange portion 60C and the second flange portion 60D are connected to each other at an upper rear side corner portion of the outer plate 60B. By providing the first flange portion 60C and the second flange portion 60D, an outer shape of a vehicle seat S is maintained.

The airbag module 62 is arranged to abut the outer plate 60B. By the first flange portion 60C and the second flange portion 60D, an effect of preventing position displacement of the airbag module 62 to the upper side and the rear side is also provided.

As shown in FIG. 25, the inner plate 60A is formed in a level difference structure having a level difference between the front side and the rear side in such a shape that the gap between the inner plate 60A and the outer plate 60B is more on the rear side than the front side.

As shown in FIG. 26, the ribs 60F extend in the seat front to back direction and couple the inner plate 60A and the outer plate 60B. The plural ribs 60F are provided, and the ribs 60F are arranged at substantially equal intervals from the vicinity of upper ends to the vicinity of lower ends between the inner plate 60A and the outer plate 60B. A length of the ribs 60F in the seat front to back direction is shorter than a corresponding length of the inner plate 60A and the outer plate 60B. A space is formed between the inner plate 60A and the outer plate 60B on the seat rear side of the ribs 60F. In such a space, a coupling part of an upper frame 11 and the seatback side frame 12L is arranged. As shown in FIG. 22, even at the time point when the occupant is not seated, the ribs 60F and the seatback side frame 12L at least partly abut each other.

By providing the ribs 60F in such a way, rigidity of the inner plate 60A and the outer plate 60B is enhanced, so that a property of holding the occupant can be enhanced, and a shock absorbing property can also be enhanced. The length of the ribs 60F in the seat front to back direction may reach the rear side of a level different part of the inner plate 60A. By doing so, the rigidity of the inner plate 60A and the outer plate 60B can be more improved. As a matter of course, a shape of the ribs 60F is not limited to the shape shown in the figures but may be for example a flat plate shape extending in the up and down direction.

Next, an attachment structure of the support member 60 is described. As shown in FIGS. 25 and 26, two screw attachment portions 60E are provided in a rear side end portion of the inner plate 60A.

Each of the screw attachment portions 60E is formed by a screw through hole and a thick portion around the screw through hole. The screw through hole is a hole through which a screw 61 is inserted, and a through hole is provided in the inner plate 60A at a corresponding position. In such a way, by providing the thick portion around the screw through hole in the screw attachment portion 60E, rigidity of the screw attachment portion 60E is improved.

As shown in FIG. 22, the coupling part of the upper frame 11 and the seatback side frame 12L is arranged between the inner plate 60A and the outer plate 60B. Screw attachment holes are provided in the upper frame 11 at positions to face the screw attachment portions 60E, and the screw attachment portions 60E and the upper frame 11 are fastened to each other by the screws 61. In such a way, the support member 60 is fixed to the coupling part of the upper frame 11 and the seatback side frame 12L.

The inner plate 60A of the support member 60 arranged on the seat inner side is fastened to the coupling part of the upper frame 11 and the seatback side frame 12L, while the outer plate 60B arranged on the seat outer side abuts, but is not fastened to a part of the seatback side frame 12L on the seat outer side and hence serves as a free end.

By fixing the inner part of the support member 60 and making the outer part the free end in such a way, as shown in FIG. 27, in a case where a load is added to the support member 60 from the outside, the screw attachment portions 60E serve as a fixed end to facilitate movement and deformation of the outer plate 60B, so that the load can be released. That is, by the inner part of the support member 60 serving as the fixed end and the outer part serving as the free end, the property of absorbing a shock from the outside is improved. Against a load from the seat inner side, since the ribs 60F of the support member 60 are supported by the seatback side frame 12L, the property of holding the occupant can be enhanced.

Since only the inner part of the support member 60 serves as the fixed end, by providing the thick portions in the screw attachment portions 60E serving as the fixed end, the rigidity of the screw attachment portions 60E is improved, so that the support member 60 can stably hold.

Since the inner plate 60A is arranged to overlap with a height of a chest portion of the occupant, ribs of the occupant can be properly protected by support of the inner plate 60A.

As described above, the support member 60 is attached by arranging the inner plate 60A and the outer plate 60B over the inner side and the outer side in the seat width direction in the coupling part of the upper frame 11 and the seatback side frame 12L. Therefore, the support member 60 is arranged more compactly than the one attached to the coupling part of the upper frame 11 and the seatback side frame 12L by using a space only on the outer side in the seat width direction.

Next, a configuration of the stay cloth attachment plate 66 to which the stay cloths serving as a guide member that guides the deployment direction of the airbag 62A of the airbag module 62 is attached, and an attachment structure of the stay cloth attachment plate is described.

The stay cloth attachment plate 66 is a thin-plate-shaped resin plate. For example, the stay cloth attachment plate 66 may be made of resin such as thermo polyolefin (TPO) and thermoplastic polyurethane (TPU).

As shown in FIG. 30, the stay cloth attachment plate 66 is formed by a substantially-rectangular-shaped rectangular region 66A, and a substantially-arch-shaped arch region 66B coupled to the rectangular region 66A. In a center portion of the rectangular region 66A, a first through hole 66C, a second through hole 66D, and a third through hole 66E are formed along the longitudinal direction of the rectangular region 66A. Washers 67 are provided for the first through hole 66C and the third through hole 66E.

As shown in FIG. 18, a first attachment portion 62D and a second attachment portion 62E of the airbag module 62 are respectively inserted through the first through hole 66C and the second through hole 66D. The first through hole 66C and the second through hole 66D are arranged at positions to face an airbag attachment hole 12a and an airbag attachment hole 12g of the seatback side frame 12L. The first attachment portion 62D and the second attachment portion 62E are stud bolts projecting from the inflator 62B to the seat inner side.

The first attachment portion 62D of the airbag module 62 is inserted through the first through hole 66C of the stay cloth attachment plate 66 and the airbag attachment hole 12a of the seatback side frame 12L from the seat outer side and fixed by using a fastening tool such as a nut. Similarly, the second attachment portion 62E of the airbag module 62 is inserted through the second through hole 66D of the stay cloth attachment plate 66 and the airbag attachment hole 12g of the seatback side frame 12L from the seat outer side and fixed by using a fastening tool such as a nut. Thereby, the stay cloth attachment plate 66 and the airbag module 62 are fixed to the seatback side frame 12L.

A configuration relating to attachment of the stay cloths to the stay cloth attachment plate 66 is described. As shown in FIG. 30, in the stay cloth attachment plate 66, a first sewing portion 66F and a second sewing portion 66G, to which the stay cloths are respectively sewn, are provided on the left side and the right side of the first through hole 66C, the second through hole 66D, and the third through hole 66E.

Specifically, as shown in FIG. 31, the stay cloth attachment plate 66 is sewn to the inner stay cloth 68 at the first sewing portion 66F and the second sewing portion 66G. The inner stay cloth 68 and the outer stay cloth 69 are sewn to each other at a stay cloth sewing portion 70. Thereby, the stay cloth attachment plate 66, the inner stay cloth 68, and the outer stay cloth 69 are integrated.

Holes are formed at two points of a first hole portion 68A and a second hole portion 68B of the inner stay cloth 68. The first hole portion 68A and the second hole portion 68B are respectively arranged at positions overlapping with the first through hole 66C and the second through hole 66D of the stay cloth attachment plate 66.

As shown in FIGS. 28 and 29, the side surface of the airbag module 62 on the seat inner side is covered by the inner stay cloth 68, and the side surface on the seat outer side is covered by the outer stay cloth 69. Respective end portions of the inner stay cloth 68 and the outer stay cloth 69 are sewn together with a skin 73 of a cushion material 72 at a split portion 71. Thereby, in a case where the gas generated by the inflator 62B is charged into the airbag 62A, the bulging direction is guided by the inner stay cloth 68 and the outer stay cloth 69, and the airbag 62A is deployed while splitting the split portion 71.

Hereinafter, a supplementary description is given to a relationship between attachment positions of the support member 60, the stay cloth attachment plate 66, and the airbag module 62.

For example, as shown in FIGS. 19 and 20, a lower end of the stay cloth attachment plate 66 is positioned above a bead portion 12c (fragile portion) formed in the seatback side frame 12L. In such a way, by attaching the side airbag mechanism SA to the seatback side frame 12L on the upper side of a deformed point at the time of rear surface collision, deformation of an attached point of the side airbag mechanism SA can be prevented. Thereby, a shock onto the side airbag mechanism SA can be eased.

As shown in FIG. 20, in a seat side surface view, the inflator 62B is arranged to overlap with both the support member 60 and the stay cloth attachment plate 66.

As shown in FIG. 23, part of the outer plate 60B of the support member 60 (that is, on the side of the free end of the support member 60) and the inflator 62B are arranged at the positions overlapping with each other in a seat side surface view.

As shown in FIG. 23, the second flange portion 60D serving as a rear wall of the support member 60 and at least part of the harness 64 are arranged at the positions overlapping with each other in a seat rear surface view. In such a way, by the second flange portion 60D receiving a load from the rear side, the harness 64 can be protected.

As shown in FIG. 23, thickness of the outer plate 60B of the support member 60 is greater than thickness of the stay cloth attachment plate 66. By doing so, the rigidity of the support member 60 receiving a load in the seat width direction can be enhanced more than the stay cloth attachment plate 66.

As shown in FIG. 23, at the time of a normal seating posture, at least part of the support member 60 and at least part of the stay cloth attachment plate 66 are positioned on the same horizontal plane. In other words, at least part of the support member 60 and at least part of the stay cloth attachment plate 66 overlap with each other in the up and down direction. Specifically, an upper end portion of the arch region 66B of the stay cloth attachment plate 66 and a lower end portion of the outer plate 60B and a lower end portion of the second flange portion 60D of the support member are placed at positions overlapping with each other in the up and down direction.

As shown in FIG. 23, the upper frame 11, the inflator 62B, and the harness 64 respectively have parts positioned on the horizontal plane where part of the support member 60 and part of the stay cloth attachment plate 66 overlap with each other in the up and down direction.

In the present embodiment, the vehicle seat according to the present disclosure is mainly described. However, the above embodiment does not limit the present disclosure but only suggests one example for facilitating understanding of the present disclosure. The present disclosure can be changed and improved without departing from the gist thereof, and the present disclosure includes equivalents thereof as a matter of course.

For example, in the present embodiment, the configuration in which the support member is attached to only one of the right and left side frames is described. However, in order to enhance the property of holding the occupant on both the sides of the seat, symmetrically formed support members may be attached to both the side frames.

For example, the support member 60 and the stay cloth attachment plate 66 may be integrated. Specifically, the outer plate 60B of the support member 60 and the stay cloth attachment plate 66 may be integrated.

For example, the support member 60 and the stay cloth attachment plate 66 may be coupled to each other by a coupling member. Specifically, the outer plate 60B of the support member 60 and the stay cloth attachment plate 66 may be coupled to each other by a metal or resin coupling plate.

TABLE OF REFERENCE NUMERALS

S: Vehicle seat
S1: Seatback
S2: Seat cushion
S3: Headrest
SA: Side airbag mechanism
F1, F2, F1a: Vehicle seat frame
10: Seatback frame
11: Upper frame
12L, 12R: Seatback side frame
   12a, 12g: Airbag attachment hole
   12b: Stay cloth clip attachment hole
   12c, 12d, 12e: Bead portion
   12f: Hole
13: Lower frame
   13a: Lower frame lower end portion
   13b: Flange portion
   13c: forward extending region
14: Reclining shaft/Coupling member
15: Pressure receiving member
   15A: Side wire
   15B: Cross wire
   15C: Center wire
16: Upper cross member
17, 18: S spring
   17A: Locking portion
19: S spring hook bracket
   19A: Fixing portion
   19B: Hook portion
   19C: Bead portion
20: Seat cushion frame
21L, 21R: Cushion side frame
   21a, 21b, 21c, 21d, 21e: Bead portion
22: Pan frame
24: Coupling pipe
25: S spring
26: Engagement hook
27: Fixing bracket
30: Slide rail mechanism
31: Lower rail
32: Upper rail
40: Height adjustment mechanism
45: Link
46: Height adjustment operation portion
50: Reclining mechanism
51: Reclining operation portion
60: Support member
   60A: Inner plate
   60B: Outer plate
   60C: First flange portion
   60D: Second flange portion
   60E: Screw attachment portion
   60F: Rib (coupling plate)
61: Screw
62: Airbag module
   62A: Airbag
   62B: Inflator
   62D: First attachment portion
   62E: Second attachment portion
64: Harness
66: Stay cloth attachment plate
   66A: Rectangular region
   66B: Arch region
   66C: First through hole
   66D: Second through hole
   66E: Third through hole
   66F: First sewing portion
   66G: Second sewing portion
67: Washer
68: Inner stay cloth
   68A: First hole portion
   68B: Second hole portion
69: Outer stay cloth
70: Stay cloth sewing portion
71: Split portion
72: Cushion material
73: Skin
100: Waist portion supporting member
110: Coupling region
111: Projected portion
112: Positioning hole
120: Waist portion supporting region
121: Bead portion
125: Forward protruding portion
126: Upper front face portion
127: Lower front face portion
130: Rearward extending region
131: Recessed portion
132: Projected edge portion
133: Hole
140: Bent portion
141: Bent portion rearward extending region
142: Bent portion lower end portion
143: Recessed portion
145: Member attachment hole
150: Connection portion
151: Reinforcing portion
160: Cutout portion
200: Welded portion
201: Bead portion
300, 310, 350: Actuator 301, 311: Connector
320, 321: Wire
330: Cut and upward-bent portion
331: Hole portion
340: Rail bottom bracket
341: Engagement hole

The invention claimed is:

1. A seat frame for a conveyance seat, comprising:
a seat cushion frame that forms a frame of a sitting part of the conveyance seat;
a seatback frame that forms a frame of a backrest part of the conveyance seat, wherein the seatback frame includes right and left side frames and a lower frame;
a waist portion supporting member coupled to the lower frame; and
a coupling member that couples the side frames; wherein
the waist portion supporting member includes a plate-shaped member having:
a coupling region that extends in a seat width direction, the coupling region having a rear portion that includes a downward extending portion that extends downward and extends in the seat width direction along the lower frame and is coupled to a back surface of the lower frame from a rear of the waist portion supporting member, and
a waist portion supporting region that extends from the coupling region toward the seat cushion frame and is configured to support a waist portion of an occupant; and
the waist portion supporting member is disposed at a position that overlaps the coupling member in a height direction; and
a front end of the waist portion supporting member is disposed behind a front end of the coupling member.

2. The seat frame according to claim 1, wherein
the waist portion supporting member has a bent portion provided at at least one of end portions of the waist portion supporting member in the seat width direction, the bent portion extending in a direction away from the coupling member and in a direction perpendicular to the seat width direction.

3. The seat frame according to claim 2, wherein
the bent portion has an extending region that extends from a front portion of the waist portion supporting member to a rear of the waist portion supporting member and toward the lower frame,
the waist portion supporting member comprises in a front face portion thereof:
a forward protruding portion that is provided at a central portion of the waist portion supporting member in an up to down direction and is bent to protrude forward;
an upper front face portion that is in an upper side of the forward protruding portion; and
a lower front face portion that is in a lower side of the forward protruding portion, and
the bent portion is provided at the upper front face portion.

4. The seat frame according to claim 3, wherein
the lower frame has a forward extending region that extends to face the extending region of the bent portion in a lower portion of the lower frame, and
a lower end of the forward extending region is positioned below a lower end of the bent portion.

5. The seat frame according to claim 3, wherein
the lower frame has a bead portion that extends in the seat width direction and projects toward the seated part,
the extending region of the bent portion has a recessed portion recessed toward the seated part,
the recessed portion and the bead portion are arranged at positions to face each other, and
the recessed portion is located above the coupling member.

6. The seat frame according to claim 3, wherein
the forward protruding portion is located above the coupling member.

7. The seat frame according to claim 2, wherein
the waist portion supporting member has a cutout portion formed around a connection portion between the waist portion supporting region and the bent portion, and
the cutout portion is provided at a front face portion of the waist portion supporting member.

8. The seat frame according to claim 7, wherein
the connection portion has a reinforcing portion formed in a shape that projects toward the lower frame, and
the reinforcing portion is provided at the front face portion of the waist portion supporting member, extends in the seat width direction and intersects perpendicularly with the bent portion.

9. The seat frame according to claim 2, wherein
the bent portion has a member attachment portion to which a member is attached, and
the member attachment portion is provided on a surface of the bent portion and positioned at a rear of the coupling member.

10. The seat frame according to claim 2, wherein
a lower end portion of the bent portion is located below a lower end of the coupling member.

11. The seat frame according to claim 2, wherein
a lower end portion of the bent portion is located between the coupling member and the lower frame in a seat front to rear direction.

12. The seat frame according to claim 1, wherein
a length of the waist portion supporting region of the waist portion supporting member in the seat width direction is larger than a length of the coupling region of the waist portion supporting member in the seat width direction,
the lower frame has a plurality of bead portions, wherein each of the plurality of bead portions extends in the seat width direction and projects toward the seated part,
a projected portion that is projected downward is formed at the coupling region, and
the projected portion extends to an area between the plurality of bead portions.

13. The seat frame according to claim 1, wherein
the waist portion supporting member has a region that is formed with a recessed portion and a projected edge portion, the region being formed in a lower portion of the waist portion supporting region, and
a hole is formed in the projected edge portion.

14. The seat frame according to claim 1, wherein
the waist portion supporting member is arranged to be separated from the coupling member.

15. The seat frame according to claim 1, wherein
the waist portion supporting member is arranged at a rear of a center of the coupling member in a seat front to rear direction.

16. The seat frame according to claim 1, wherein
the waist portion supporting member comprises in a front face portion thereof:

a forward protruding portion that is provided at a central portion of the waist portion supporting member in an up to down direction and is bent to protrude forward;

an upper front face portion that is in an upper side of the forward protruding portion; and a lower front face portion that is in a lower side of the forward protruding portion, and the coupling member is arranged at a front of the lower front face portion.

17. The seat frame according to claim 1, wherein the coupling member is a reclining shaft of a reclining mechanism mounted to the seatback frame.

* * * * *